United States Patent
Kurita

(10) Patent No.: US 8,019,891 B2
(45) Date of Patent: Sep. 13, 2011

(54) NETWORK CONNECTION CONTROL TECHNIQUE, NETWORK CONNECTION TECHNIQUE AND AUTHENTICATION APPARATUS

(75) Inventor: Toshihiko Kurita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 30 days.

(21) Appl. No.: 12/493,427

(22) Filed: Jun. 29, 2009

(65) Prior Publication Data

US 2010/0088416 A1  Apr. 8, 2010

(51) Int. Cl.
*G06F 15/16* (2006.01)
(52) U.S. Cl. .......................... 709/245; 709/218; 709/227
(58) Field of Classification Search .................. 709/227, 709/245, 218; 370/352, 354, 401
See application file for complete search history.

(56) References Cited

U.S. PATENT DOCUMENTS

| 7,561,581 | B2* | 7/2009 | Kim et al. ...................... 709/245 |
| 7,787,476 | B2* | 8/2010 | Shimizu et al. ............... 370/401 |
| 2002/0174232 | A1 | 11/2002 | Kikuta et al. |
| 2003/0177267 | A1* | 9/2003 | Orava et al. ................... 709/245 |
| 2005/0174998 | A1* | 8/2005 | Vesterinen et al. ........... 370/354 |
| 2007/0198656 | A1* | 8/2007 | Mazzaferri et al. ........... 709/218 |

FOREIGN PATENT DOCUMENTS

| JP | 11-187146 | 7/1999 |
| JP | 11-298552 | 10/1999 |
| JP | 2002-215015 | 7/2002 |

* cited by examiner

*Primary Examiner* — Ramy Osman
(74) *Attorney, Agent, or Firm* — Katten Muchin Rosenman LLP

(57) ABSTRACT

A network connection method includes: generating the same address as an address that is other than address currently used by the user terminal and is generated by the authentication apparatus, as a reconnection address, and storing the reconnection address that is valid for a predetermined valid period into a reconnection address storage device; and when a present time is within the predetermined valid period after the connection with the first network is disconnected, reconnecting to the first network by using the reconnection address stored in the reconnection address storage device without the authentication by the authentication apparatus.

4 Claims, 20 Drawing Sheets

| 201 | 202 | 203 |
|---|---|---|
| USER ID | PASSWORD | MAC ADDRESS OF TERMINALS |
| aaaaa | a1234 | 00:01:02:03:04:10 |
| bbbbb | b2345 | 00:01:02:03:04:11 |
| ⋮ | ⋮ | ⋮ |

FIG.2

| 301 | 302 |
|---|---|
| ALLOCATABLE SrcMAC ADDRESS | ALLOCATION FLAG |
| 01:01:01:01:01:33 | 0 |
| 01:01:01:01:01:34 | 1 |
| 01:01:01:01:01:35 | 0 |
| 01:01:01:01:01:36 | 1 |
| 01:01:01:01:01:37 | 0 |
| ⋮ | ⋮ |

FIG.3

| 401 | 402 |
|---|---|
| RECONNECTION SrcMAC ADDRESS | EXPIRING DATE AND TIME |
| 01:01:01:01:01:33 | |
| 01:01:01:01:01:34 | |
| 01:01:01:01:01:35 | |
| 01:01:01:01:01:36 | 2008/08/28 11:01 |
| 01:01:01:01:01:37 | |
| ⋮ | ⋮ |

FIG.4

| 501 | 502 |
|---|---|
| RECONNECTION SrcMAC ADDRESS | EXPIRING DATE AND TIME |
| 01:01:01:01:01:36 | 2008/08/28 11:01 |

FIG.5

| 601 | 602 |
|---|---|
| ENTRY NO. | MAC ADRESS FOR WHICH CONNECTION IS PERMITTED |
| 1 | 01:01:01:01:01:33 |
| 2 | 01:01:01:01:01:34 |
| 3 | 01:01:01:01:01:35 |
| 4 | 01:01:01:01:01:36 |
| ⋮ | ⋮ |

FIG.6

| 701 | 702 | 703 |
|---|---|---|
| ENTRY NO. | PORT NO. | MAC ADDRESS |
| 1 | 1 | 01:01:01:01:01:33 |
| 2 | 1 | 01:01:01:01:01:34 |
| 3 | 2 | 01:01:01:01:01:35 |
| 4 | 2 | 01:01:01:01:01:36 |
| ⋮ | ⋮ | ⋮ |

FIG.7

| MAC ADDRESS OF TERMINAL /1401 | ALLOCATABLE SrcMAC ADDRESS /1402 | ALLOCATION FLAG /1403 |
|---|---|---|
| 00:01:02:03:04:10 | 01:01:01:01:01:33 | 2 |
| 00:01:02:03:04:10 | 01:01:01:01:01:34 | 1 |
|  | 01:01:01:01:01:35 | 0 |
| 00:01:02:03:04:11 | 01:01:01:01:01:36 | 2 |
|  | 01:01:01:01:01:37 | 0 |
| ⋮ | ⋮ | ⋮ |

NETWORK CONNECTION CONTROL TECHNIQUE, NETWORK CONNECTION TECHNIQUE AND AUTHENTICATION APPARATUS

CROSS-REFERENCE TO RELATED APPLICATIONS

This application is based upon and claims the benefit of priority of the prior Japanese Patent Application No. 2008-262143, filed on Oct. 8, 2008, the entire contents of which are incorporated herein by reference.

FIELD

This technique relates to a technique for controlling connections to a network.

BACKGROUND

There is a case where, after a connection to a network is made through an access line, for which the authentication is required at the beginning of the utilization, and the user utilizes the services he or she desires through the network, the line is disconnected once because of some reasons, but the connection to the same line has to be made again. In such a case, typically, the authentication for the access line is carried out again to connect with the network. Specifically, one of following methods is adopted: (1) the user manually inputs the authentication information (i.e. a user ID and password) again to connect with the network; and (2) the authentication information is memorized in the terminal, and a communication program reads out this information at the time of the reconnection to connect with the network without any user's intervention.

However, in the aforementioned conventional technique, a processing for the authentication by the authentication apparatus or the like is required every reconnection. Therefore, large overheads are imposed on the authentication apparatus or the like. In addition, because it takes time to carry out the authentication processing, there is a problem that the user of the network cannot reconnect to the network soon. However, because the access line, for which the authentication is originally required, the authentication cannot be simply omitted.

Namely, the conventional technique cannot realize that the user terminal smoothly connects with the network while reducing the processing load for the authentication without deteriorating the security.

SUMMARY

According to one aspect of this technique, a network connection control method is a method for controlling a network connection of a user terminal that is connected through a gateway having an address filter table storing addresses, for which a connection to a first network is permitted, to the first network, after authentication by an authentication apparatus connected to the gateway is completed, and is connected through a second network to the gateway. Then, this method includes: at a first timing when a disconnection request for a connection with the first network is received from the user terminal, or before the first timing, the authentication apparatus extracting an allocatable address other than an address currently used by the user terminal from an allocated address storage device storing addresses in association with information representing whether or not the corresponding address is allocatable; the authentication apparatus transmitting the extracted address as a reconnection address, which is valid for a predetermined valid period, to the user terminal; and the authentication causing the gateway to update the address filter table of the gateway from the address currently used by the user terminal to the reconnection address at a timing of the disconnection of the user terminal from the first network. Furthermore, when a reconnection to the first network is requested from the user terminal by using the reconnection address within the predetermined valid period, the gateway allows the reconnection of the user terminal to the first network without passing the authentication by the authentication apparatus.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a diagram depicting an example of data stored in an authentication table storage;

FIG. 3 is a diagram depicting an example of data stored in an allocatable SrcMAC address table storage;

FIG. 4 is a diagram depicting an example of data stored in a MAC timer;

FIG. 5 is a diagram depicting an example of data stored in a reconnection ScrMAC address storage;

FIG. 6 is a diagram depicting an example of data stored in a MAC filter table storage;

FIG. 7 is a diagram depicting an example of data stored in a MAC learning table storage;

DESCRIPTION OF EMBODIMENTS

Figure 1:
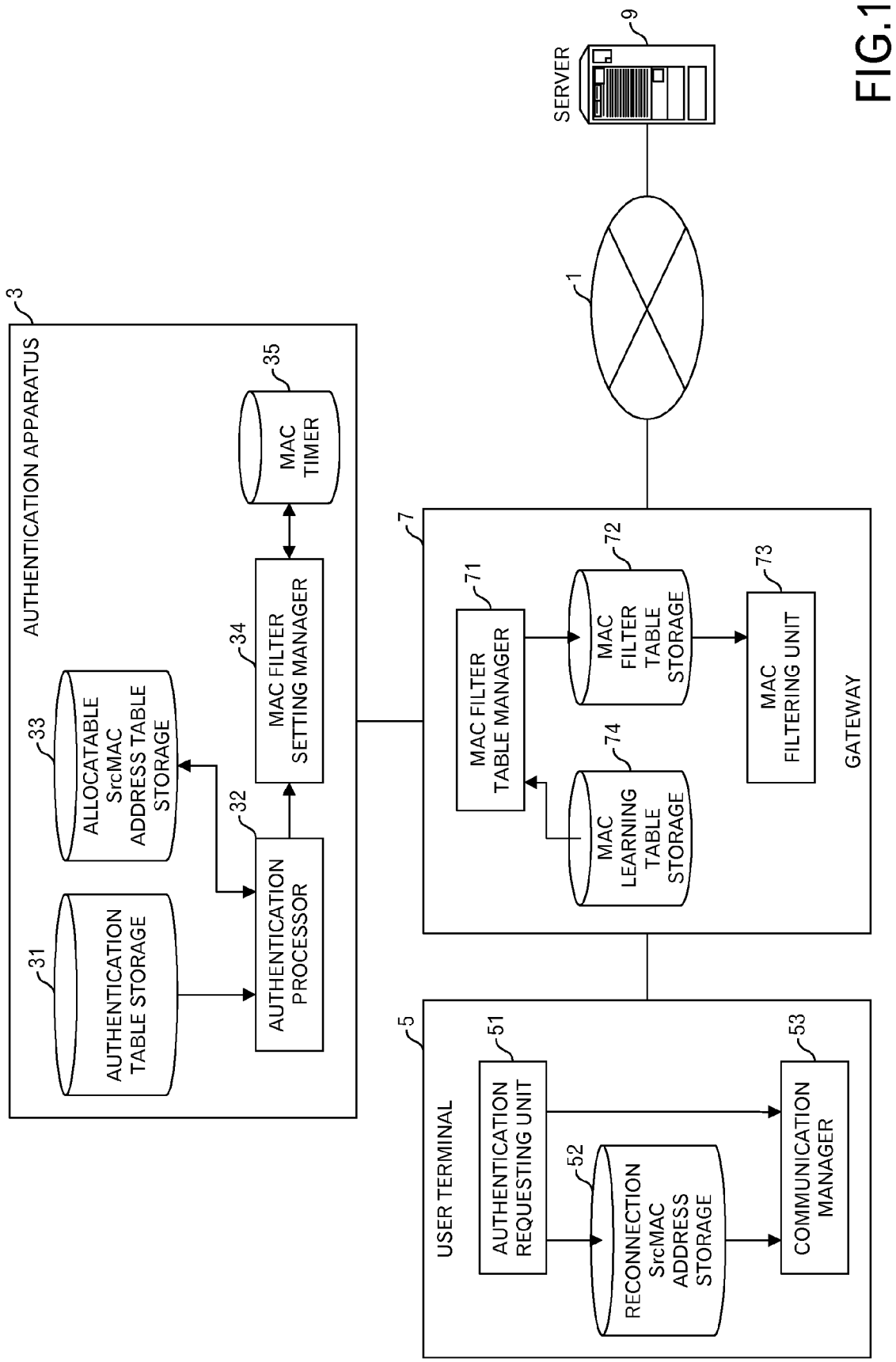
FIG. 1 is a functional block diagram of a system relating to first and second embodiments.

FIG. 1 depicts a system outline diagram relating to first and second embodiments of this technique. The system outline diagram relating to third and fourth embodiments will be explained by using FIG. 19 later. In FIG. 1, a gateway 7 and a server 9, which is an application server, for example, are connected with a network 1. An authentication apparatus 3, which is a Remote Authentication Dial In User Service (RADIUS) server, for example, is connected to the gateway 7. In addition, a user terminal 6, which may be, for example, a personal computer or a Personal Digital Assistant (PDA), is connected with the gateway 7 through an access line. Here, although only one user terminal 6 and only one server 9 are depicted in FIG. 1, the numbers of those apparatuses are not limited.

The authentication apparatus 3 has an authentication table storage 31, an authentication processor 32 that carries out an authentication processing and transmits a SrcMAC address, an allocatable SrcMAC address table storage 33, a MAC filter setting manager 34 that controls the passage and interception of packets in the gateway 7, and a MAC timer 35. "Src" is attached in order to represent that the address is different from the MAC address intrinsic to the terminal.

The user terminal 5 has an authentication requesting unit 51 that transmits an authentication request and a disconnection request to the authentication apparatus 3 and receives the SrcMAC address; a reconnection SrcMAC address storage 52; and a communication manager 53 that manages the MAC addresses of the user terminals 5 and carries out the communication.

The gateway 7 has a MAC filter table storage 72, a MAC filter table manager 71 that manages data stored in the MAC filter table storage 72, a MAC filtering unit 73 that carries out filtering according to the MAC addresses stored in the MAC filter table storage 72, and a MAC learning table storage 74.

FIG. 2 depicts an example of data stored in the authentication table storage 31. In an example of FIG. 2, a table includes a column 201 of user IDs, a column 202 of passwords and a column 203 of MAC addresses of terminals. The MAC address, which is not an MAC address temporarily allocated to the user terminal 5 and is intrinsic to the user terminal 5, is stored in the column 203 of the MAC addresses of the terminals.

FIG. 3 represents an example of data stored in the allocatable SrcMAC address table storage 33. However, here, data stored in the allocatable SrcMAC address table storage 33 used in the first embodiment will be depicted. Data stored in the allocatable SrcMAC address table storage 33 used in the second to fourth embodiments will be explained by using FIG. 14 later. In FIG. 3, a table includes a column 301 of allocatable SrcMAC addresses and a column 302 of allocation flags. The MAC addresses, which can be allocated to the user terminal 5, are stored in the column 301 of the allocatable SrcMAC addresses. The allocation flag representing whether or not the SrcMAC address can be allocated is stored into the column 302 of the allocation flags, and here, "1" represents "allocatable" and "0" represents "not allocatable". Incidentally, the SrcMAC address stored in the column 301 of the allocatable SrcMAC addresses is selected so as not to overlap with the MAC addresses of the terminals, which are stored in the authentication table storage 31.

FIG. 4 represents an example of data stored in the MAC timer 35. In an example of FIG. 4, a table includes a column 401 of reconnection SrcMAC addresses and a column 402 of expiring date and time. A MAC address that can be allocated to the user terminal is stored into the column 401 of the reconnection SrcMAC addresses. In addition, information concerning the expiring date and time for the reconnection SrcMAC address is respectively stored into the column 402 of the expiring date and time in association with the corresponding reconnection SrcMAC address. As for the reconnection SrcMAC address, which has not been allocated to the user terminal 5, the information concerning the expiring date and time is not stored.

FIG. 5 depicts an example of data stored in the reconnection SrcMAC address storage 52. In an example of FIG. 5, a table includes a column 501 of the reconnection SrcMAC address and a column 502 of the expiring date and time. A MAC address received from the authentication apparatus 3 as the reconnection SrcMAC address or a MAC address generated by the user terminal 5 is stored into the column 501 of the reconnection SrcMAC address. The information concerning the expiring date and time for the reconnection SrcMAC address is stored into the column 502 of the expiring date and time.

FIG. 6 depicts an example of data stored in the MAC filter table storage 72. In an example of FIG. 6, a table includes a column 601 of entry numbers, and a column 602 of the MAC addresses for which the connection is permitted. The packets from the user terminal 5 communicating by using one of the MAC addresses stored in the column 602 of the MAC addresses for which the connection is permitted can pass through the gateway 7. Incidentally, registration and deletion of the entry in this table are carried out by the MAC filter setting manager 34 in response to an instruction to the MAC filter setting manager 34 through an outside interface from the authentication apparatus 3.

FIG. 7 depicts an example of data stored in the MAC learning table storage 74. In an example of FIG. 7, a table includes a column 701 of entry numbers, a column 702 of port numbers, and a column 703 of MAC addresses. The gateway is, for example, a typical layer-2 switch, and the layer-2 switch manages data stored in the MAC learning table storage 74. Although not depicted in figure, the gateway 7 has functions to detect, by monitoring the received packets, which port is connected to a terminal or the like of what MAC address, and to generate and manage data stored in the MAC learning table storage 74. The MAC learning table storage 74 is typically used to determine to which port the received packet should be outputted. However, as described later, in this embodiment, the storage 74 is used for the entry deletion of the MAC filter table. Namely, the reconnection SrcMAC address, which expired and is not stored in the MAC learning table storage 74, is deleted from the MAC filter table storage 72, as being a MAC address, which is not used for the present connection.

In the following, the first to fourth embodiments will be explained in sequence.

First, the first embodiment will be explained. The processing relating to the first embodiment includes following features: (1) when the authentication is requested from the user terminal 5 to the authentication apparatus 3, the connection SrcMAC address is transmitted from the authentication apparatus 3 to the user terminal 5, and (2) when the disconnection is requested from the user terminal 5 to the authentication apparatus 3, the reconnection SrcMAC address, which is valid for a predetermined period, is transmitted to the user terminal 5 from the authentication apparatus 3. As for the processing of the user terminal 5 and the authentication apparatus 3 for the aforementioned feature (1), a connection request processing and an authentication processing will be explained in the following. In addition, as for the processing of the user terminal 5 and the authentication apparatus for the aforementioned feature (2), a disconnection request processing and a disconnection processing will be explained in the following. Moreover, a timeout processing, which is a processing common to the first to fourth embodiments, will be also explained.

First, a processing content of the connection request processing in the user terminal 5 will be explained. The connection request processing is a processing when the user terminal 5 connects to the network 1.

Figure 8:
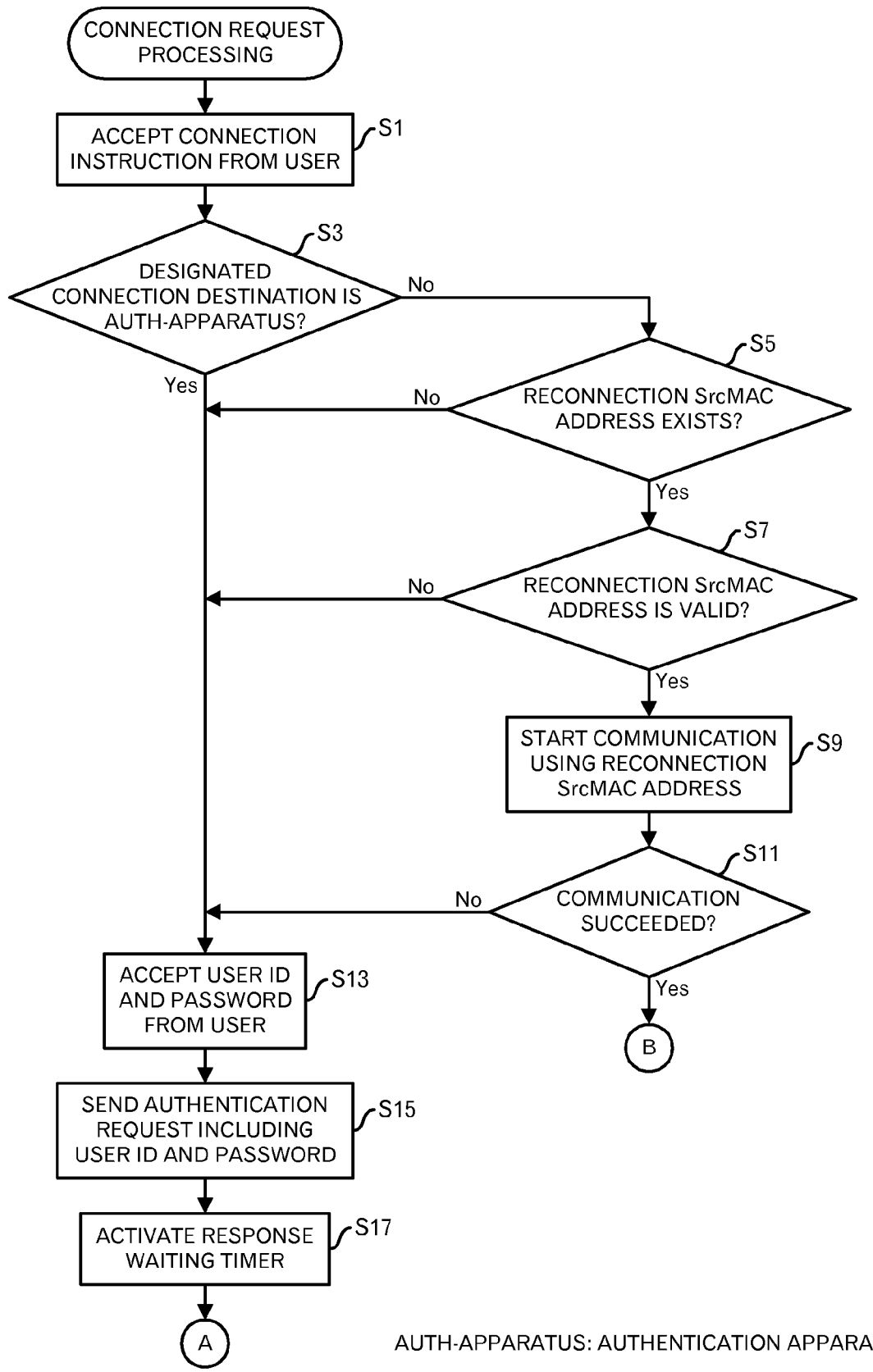
FIG. 8 is a diagram depicting a processing flow of a connection request processing in the first embodiment.

The communication manager 53 of the user terminal 5 displays a screen, which prompts an input of a connection instruction, on a display device in response to an instruction from a user, and when the connection instruction including designation of a connection destination is inputted from the user, the communication manager 53 accepts the connection instruction (FIG. 8: step S1). Then, the communication manager 53 judges whether or not the designated connection destination is the authentication apparatus (step S3). When the designated connection destination is the authentication apparatus (step S3: Yes route), the authentication requesting unit 51 of the user terminal 5 displays a screen, which prompts an input of the user ID and password, on the display device, and when the user ID and password are inputted from the user and the transmission is instructed, the authentication requesting unit 51 accepts the instruction as an authentication request (step S13).

Then, the authentication requesting unit 51 transmits an authentication request including the user ID and password to the authentication apparatus 3 (step S15). When the gateway 7 receives the authentication request, the gateway 7 relays the authentication request to the authentication apparatus 3, and the authentication apparatus 3 receives the authentication request and carries out the authentication processing and the like. The details will be explained later.

Then, the authentication requesting unit 51 of the user terminal 5 activates a response waiting timer, and waits for the receipt of a response message from the authentication apparatus 3 (step S17). The processing shifts to step S19 of FIG. 9 through a terminal A.

On the other hand, when the designated connection destination is not the authentication apparatus (step S3: No route), because there is possibility of the reconnection within a short period, the communication manager 53 confirms whether or not the reconnection SrcMAC address is stored in the reconnection SrcMAC address storage 52 (step S5). When the reconnection SrcMAC address is not stored in the reconnection SrcMAC address storage 52 (step S5: No route), the authentication by the authentication apparatus 3 is executed. Therefore, the processing shifts to the step S13.

On the other hand, when the reconnection SrcMAC address is stored in the reconnection SrcMAC address storage 52 (step S5: Yes route), the communication manager 53 confirms the information concerning the expiring date and time, which is stored in the reconnection SrcMAC address storage 52 in order to judge whether or not the connection with the network 1 is possible without the authentication (step S7). As explained later, when the disconnection processing is normally carried out, the reconnection SrcMAC address and the information concerning the expiring date and time ought to be stored in the reconnection SrcMAC address storage 52. Then, when the present date and time are not before the expiring date and time (step S7: No route), the communication manager 52 deletes the reconnection SrcMAC address and the information concerning the expiring date and time, and the processing shifts to the step S13. Because the reconnection SrcMAC address becomes invalid if the predetermined period has elapsed, the authentication by the authentication apparatus 3 is executed again.

On the other hand, when the present date and time are before the expiring date and time (step S7: Yes route), the communication manager 53 transmits packets including the reconnection SrcMAC address to the designated connection destination (e.g. the server 9) (step S9). Then, the communication manager 53 judges whether or not the communication succeeds (step S11). When the communication fails (step S11: No route), the processing shifts to the step S13. When the communication fails due to some errors, the authentication by the authentication apparatus 3 is executed. On the other hand, when the communication succeeds (step S11: Yes route), namely, when the gateway 7 receives a packet including the reconnection SrcMAC address from the user terminal 5 and the same MAC address is stored in the MAC filter table storage 72, the gateway 7 can pass the packet, and the user terminal 5 can normally connect with the server 9 on the network 1. Therefore, the processing shifts to a processing depicted in FIG. 9 through the terminal B, and further ends. Thus, when the present time is before the expiring date and time for the reconnection SrcMAC address, the user can simply connect the user terminal 5 with the network 1 without manually inputting the authentication information (e.g. user ID and password).

Incidentally, when the user terminal 5 carries out the reconnection, the user terminal 5 communicates by using the reconnection SrcMAC address (i.e. new MAC address) different from the SrcMAC address (i.e. old MAC address), which was used before the reconnection. In this case, the computer (e.g. server 9), which will communicate with the user terminal 5, does not know the new MAC address of the user terminal 5. However, because an entry for the old MAC address registered in an ARP table (which stores the MAC address in association with the IP address) held by the computer is typically deleted in about 60 seconds, there is no problem. Namely, the computer carries out an ARP processing again, and obtains the new MAC address for the IP address of the user terminal 5 to register the new MAC address into the ARP table. Then, the computer can communicate with the user terminal 5, normally.

Figure 9:
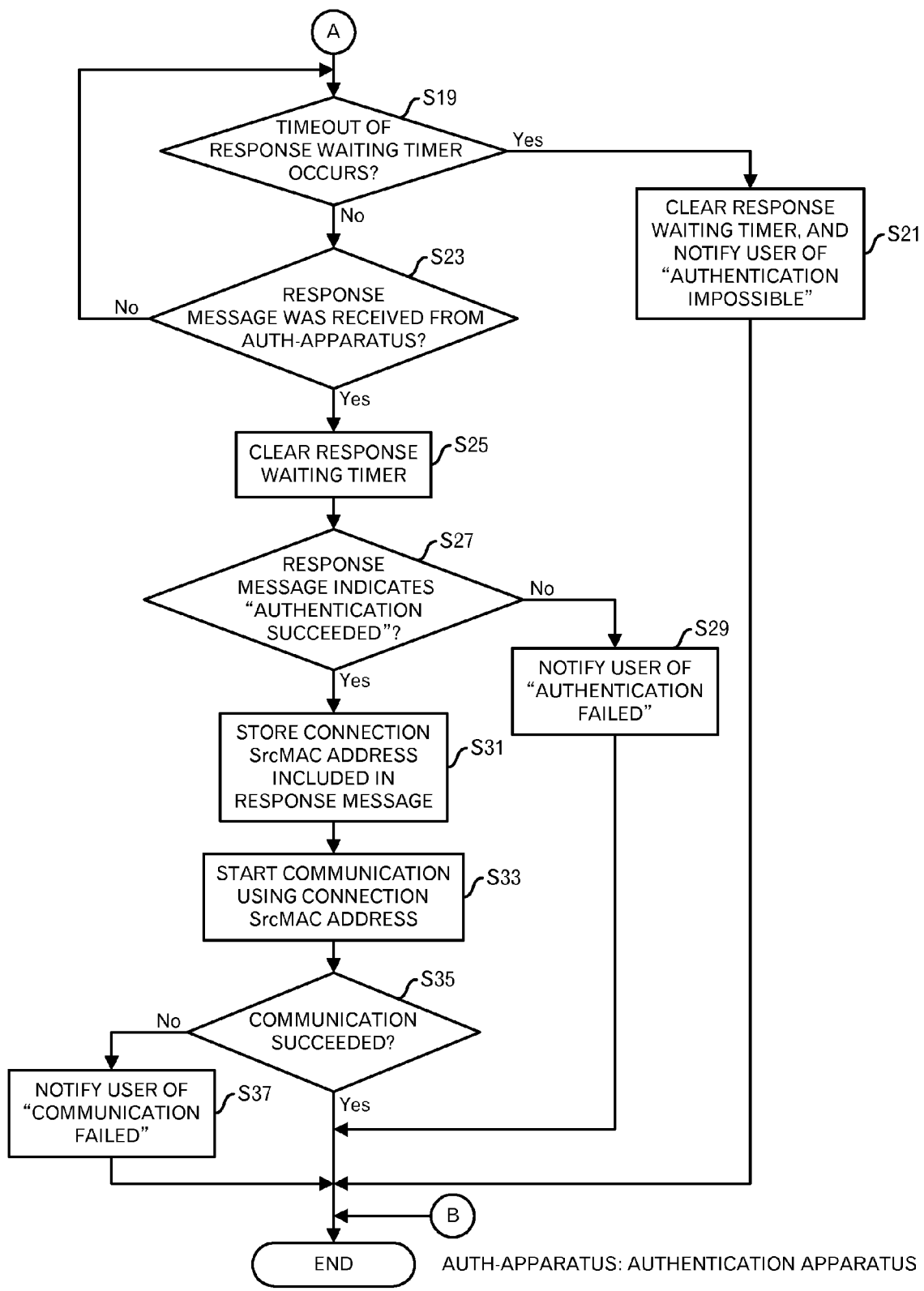
FIG. 9 is a diagram depicting a processing flow of the connection request processing in the first embodiment.

Next, FIG. 9 will be explained. The authentication requesting unit 51 judges whether or not a timeout of the response waiting timer occurs (FIG. 9: step S19). When the timeout of the response waiting timer occurs (step S19: Yes route), the authentication requesting unit 51 clears the response waiting timer, and displays a message representing "authentication impossible" on the display device (step S21), and then the processing ends. Thus, the user can recognize that the authentication processing by the authentication apparatus 3 was not normally carried out.

On the other hand, when the timeout of the response waiting timer does not occur (step S19: No route), the authentication requesting unit 51 judges whether or not a response message including the connection SrcMAC address was received from the authentication apparatus 3 (step S23). When the response message was not received from the authentication apparatus 3 (step S23: No route), the processing returns to the step S19. On the other hand, when the response message was received from the authentication apparatus 3 (step S23: Yes route), the authentication requesting unit 51 clears the response waiting timer (step S25). The connection SrcMAC address is a MAC address allocated to the user terminal 5 from the authentication apparatus 3 when the authentication succeeded, and the user terminal 5 can communicate with an apparatus on the network 1 side by attaching that MAC address to a transmission packet.

Then, the authentication requesting unit 51 confirms the content of the response message (step S27). When the content of the response message does not represent "authentication succeeded" (step S27: No route), the authentication requesting unit 51 displays a message representing "authentication failed" on the display device (step S29), and then the processing ends. Thus, it is possible for the user to recognize that the authentication failed. On the other hand, when the content of the response message represents "authentication succeeded" (step S27: Yes route), the authentication requesting unit 51 stores the connection SrcMAC address included in the response message into a storage device such as a main memory (step S31).

Then, the communication manager 53 displays a screen prompting an input of the connection destination, and when the connection destination is designated by the user and the connection is instructed, the communication manager 53 accepts the instruction as a connection request to the designated connection destination, and transmits a packet including the connection SrcMAC address stored in the storage device such as the main memory to the connection destination designated by the user (step S33).

Then, the communication manager 53 judges whether or not the communication succeeded (step S35). When the communication succeeded (step S35: Yes route), namely, when the gateway 7 receives a packet including the connection SrcMAC address from the user terminal 5 and the same MAC address is stored in the MAC filter table storage 72, the gateway 7 can pass the packet, and the user terminal 5 can normally connects with the server 9. Therefore, the processing ends. On the other hand, when the communication failed (step S35: No route), the communication manager 35 displays a message representing "communication failed" on the display device (step S37), and the processing ends. Thus, it is possible for the user to recognize that the communication failed due to some errors. Thus, the communication request processing in the user terminal 5 has been completed.

Next, a content of the disconnection request processing in the user terminal 5 will be explained by using FIG. 10. The disconnection request processing is a processing when the user terminal 5 terminates the connection with the network 1.

Figure 10:
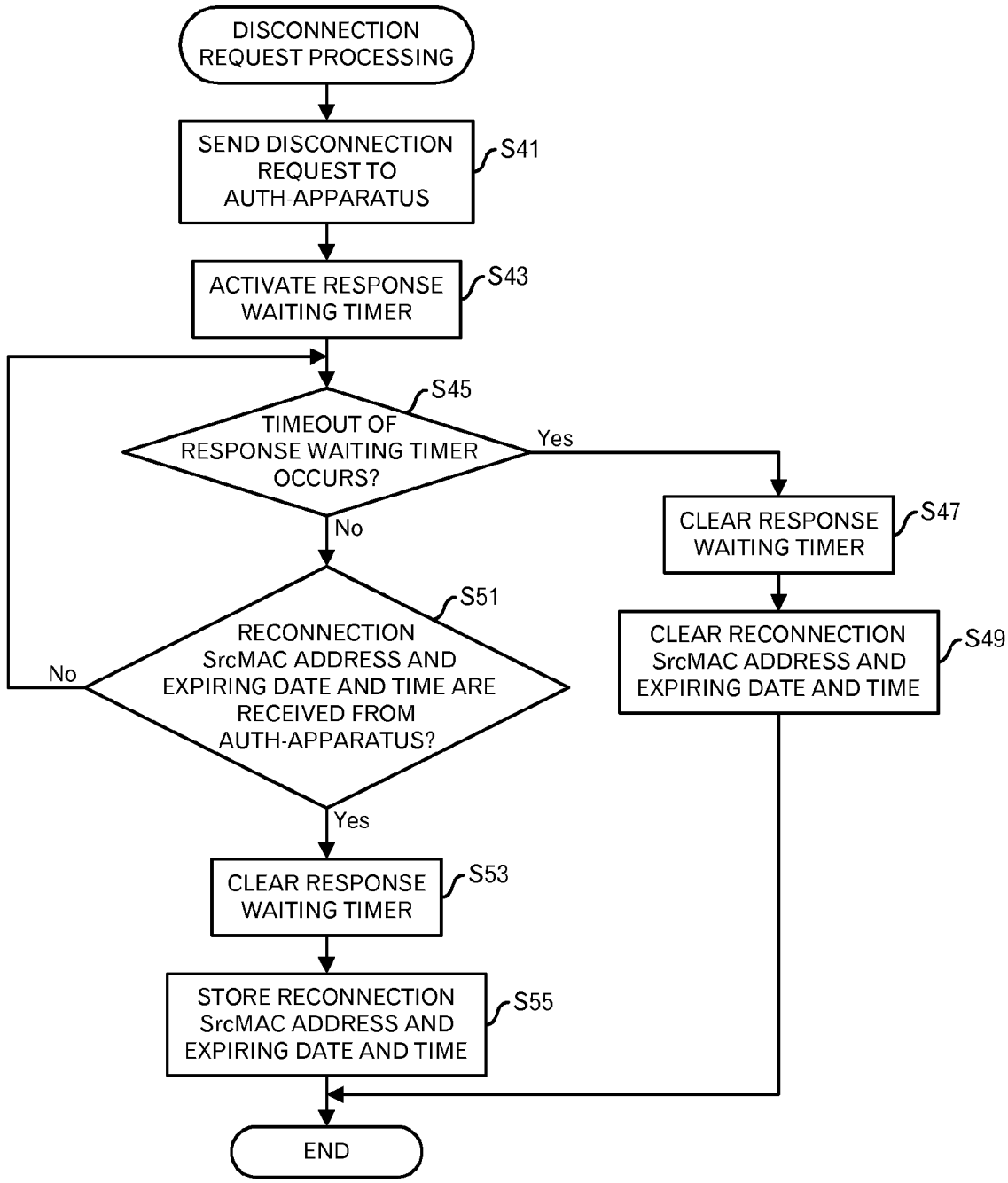
FIG. 10 is a diagram depicting a processing flow of a disconnection request processing in the first embodiment.

When the authentication requesting unit 51 of the user terminal 5 accepts an instruction of the disconnection from the user during the connection with the network 1, the authentication requesting unit 51 transmits a disconnection request to the authentication apparatus 3 (FIG. 10: step S41). The authentication apparatus 3 carries out a processing to prepare and reply the reconnection SrcMAC address as described later. Then, the authentication requesting unit 51 activates the response waiting timer and waits a response from the authentication apparatus 3 (step S43).

Then, the authentication requesting unit 51 judges whether or not the timeout of the response waiting timer occurs (step S45). When the timeout of the response waiting timer occurs (step S45: Yes route), the authentication requesting unit 51 clears the response waiting timer (step S47). Furthermore, the authentication requesting unit 51 deletes the reconnection SrcMAC address and information concerning the expiring date and time, which are stored in the reconnection SrcMAC address storage 52 (step S49), and the processing ends. This is to carry out the authentication again at the next connection after the disconnection was not normally carried out. However, when the connection is made by using the connection SrcMAC address allocated at the authentication, the reconnection SrcMAC address and the information concerning the expiring date and time are not stored in the reconnection SrcMAC address storage 52. Therefore, the processing of the step S49 is skipped.

On the other hand, when the timeout of the response waiting timer does not occur (step S45: No route), the authentication requesting unit 51 judges whether or not the reconnection SrcMAC address and the information concerning the expiring date and time have been received from the authentication apparatus 3 (step S51). When such data has not been received yet (step S51: No route), the processing returns to the step S45. On the other hand, when such data has been received (step S51: Yes route), the authentication requesting unit 51 clears the response waiting timer (step S53). Then, the authentication requesting unit 51 stores the reconnection SrcMAC address and the information concerning the expiring date and time into the reconnection SrcMAC address storage 52 (step S55), and the processing ends. Incidentally, when the present time is before the expiring date and time, the same address as the reconnection SrcMAC address is stored in the MAC filter table storage 72 in the gateway 7. Therefore, the packet including the reconnection SrcMAC address can pass through the gateway 7 without being filtered by the MAC filtering unit 73, and the user terminal 5 can normally connect with the server 9. In addition, the SrcMAC address allocated to the user terminal 5 as the reconnection SrcMAC address is managed in the allocatable SrcMAC address table storage 33, and is selected so as not to overlap with the SrcMAC addresses allocated to other user terminals and MAC addresses, which are intrinsic to the terminals and stored in the authentication table storage 31. The details will be explained later. Thus, the disconnection request processing in the user terminal 5 completes.

Next, a content of the authentication processing in the authentication apparatus 3 will be explained by using FIG. 11. The authentication processing is a processing carried out when the authentication apparatus 3 receives the authentication request from the user terminal 5.

Figure 11:
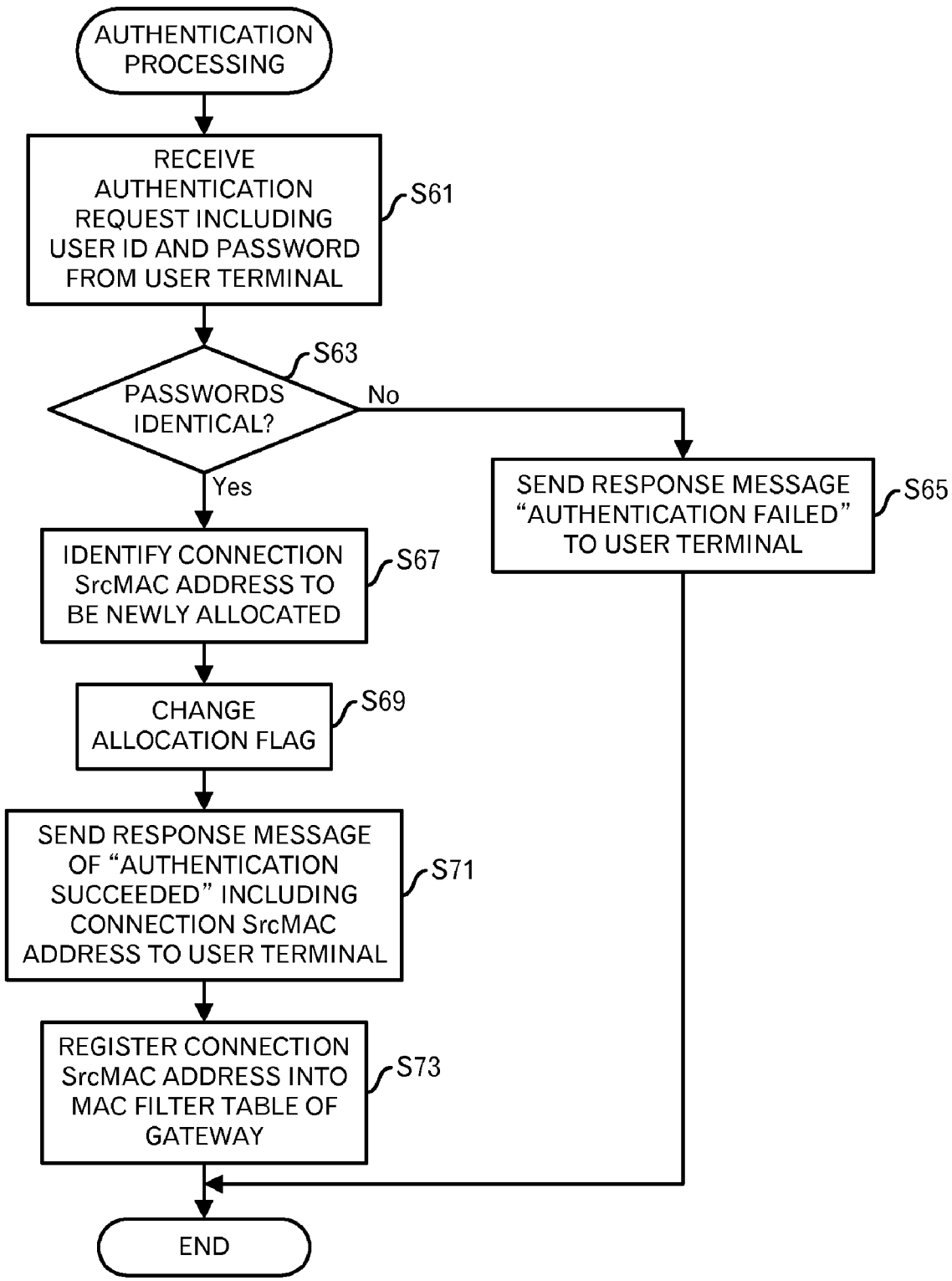
FIG. 11 is a diagram depicting a processing flow of an authentication processing in the first embodiment.

The authentication processor 32 of the authentication apparatus 3 receives the authentication request including the user ID and password from the user terminal 5, and stores them into a storage device such as a main memory (FIG. 11: step S61). Then, the authentication processor 32 identifies the password registered in association with the received user ID in the authentication table storage 31, and judges whether or not the received password is identical with the identified password (step S63). When it is judged that the passwords are not identical (step S63: No route), the authentication processor 32 transmits a response message representing "authentication failed" to the user terminal 5 (step S65), and the processing ends.

On the other hand, when the passwords are identical (step S63: Yes route), the authentication processor 32 identifies one allocatable SrcMAC address stored in the allocatable SrcMAC address table storage 33, and stores the identified SrcMAC address into the storage device such as the main memory (step S67). Here, the authentication processor 32 refers to the allocation flags to identify one SrcMAC address with a flag representing "0" (i.e. it is allocatable) as the connection SrcMAC address. In addition, the authentication processor 32 changes the allocation flag corresponding to the identified SrcMAC address to "1" (i.e. not allocatable) (step S69). Then, the authentication processor 32 transmits a response message, which represents "authentication succeeded" and includes the identified connection SrcMAC address, to the user terminal 6 (step S71).

Incidentally, at the step S63, in addition to the confirmation of whether or not the passwords are identical, it may be confirmed whether or not the MAC address, which is intrinsic to the user terminal 5 and included in the authentication request is identical with the MAC address of the terminal, which is stored in the authentication table storage 31 in association with the received user ID. This is to allocate the connection SrcMAC address or the like only to the user terminal, which is previously registered. In addition, the authentication apparatus 3 manages the MAC addresses intrinsic to the user terminals 5 by using the authentication table storage 31 not to allocate the MAC addresses identical to such managed MAC addresses as the SrcMAC addresses.

Then, the MAC filter setting manager 34 of the authentication apparatus 3 instructs the MAC filter table manager 71 of the gateway 7 to register the connection SrcMAC address stored in the storage device such as the main memory into the MAC filter table storage 72, and the MAC filter table manager 71 registers the connection SrcMAC address into the MAC filter table (step S73). Thus, the MAC filtering unit 73 of the gateway 7 can pass packets including the connection SrcMAC address to the network 1 side. Then, the authentication processing in the authentication apparatus 3 ends.

Next, a content of the disconnection processing in the authentication apparatus 3 will be explained by using FIG. 12. The disconnection processing is a processing carried out when the authentication apparatus 3 receives the disconnection request from the user terminal 5.

Figure 12:
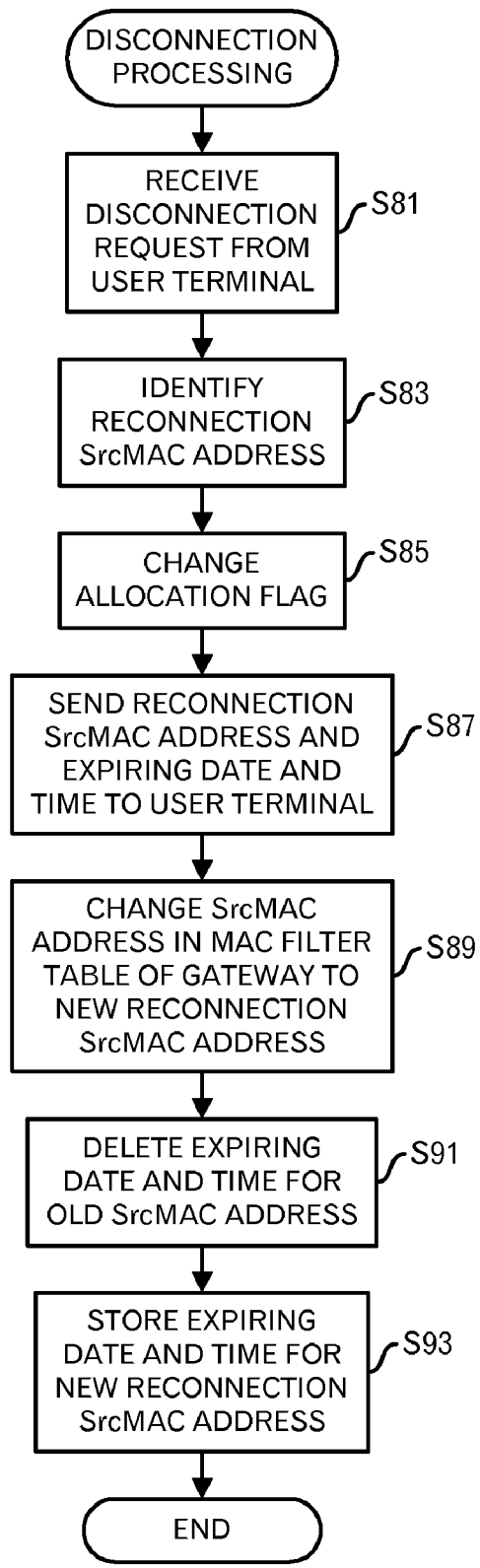
FIG. 12 is a diagram depicting a processing flow of a disconnection processing in the first embodiment.

The authentication processor 32 of the authentication apparatus 3 receives the disconnection request from the user terminal 5, and stores the request into the storage device such as the main memory (FIG. 12: step S81). Then, the authentication processor 32 identifies one allocatable SrcMAC address stored in the allocatable SrcMAC address table storage 33, and stores the identified SrcMAC address into the storage device such as the main memory (step S83). Here, the authentication processor 32 refers to the allocation flags to identify one SrcMAC address with the flag representing "0" as the reconnection SrcMAC address. In addition, the authentication processor 32 changes the allocation flag corresponding to the identified MAC address to "1", and changes the allocation flag corresponding to the MAC address (i.e. SrcMAC address currently used by the user terminal 5) included in the disconnection request to "0" (step S85).

Then, the authentication processor 32 generates and stores into the storage device such as the main memory, information concerning the expiring date and time, and transmits the identified reconnection SrcMAC address and the information concerning the expiring date and time to the user terminal 5 through a secure path (e.g. Secure Sockets Layer (SSL) or the like) (step S87). The information concerning the expiring date and time may be arbitrarily set, and for example, it is a time of one hour after the present time. The user terminal 5 stores the reconnection SrcMAC address and the information concerning the expiring date and time into the reconnection SrcMAC address storage 52 as described at the step S55 of FIG. 10.

Then, the MAC filter setting manager 34 of the authentication apparatus 3 instructs the MAC filter table manager 71 of the gateway 7 to change the MAC address, which is included in the disconnection request stored in the storage device such as the main memory and is registered in the MAC filter table storage 72, to the reconnection SrcMAC address stored in the storage device such as the main memory, and the MAC filter table manager 71 changes the MAC filter table according to the instruction (step S89). Thus, the MAC filtering unit 73 of the gateway 7 passes packets including that reconnection SrcMAC address to the network 1 side.

Then, the MAC filter setting manager 34 of the authentication apparatus 3 deletes the information concerning the expiring date and time for the MAC address included in the disconnection request stored in the storage device such as the main memory, from the MAC timer 35 (step S91). However, when the information concerning the expiring date and time for the MAC address of the user terminal 5, which is included in the disconnection request, is not stored in the MAC timer 35, namely, when the MAC address is the connection SrcMAC address allocated at the authentication, the processing of the step S91 is skipped.

Then, the MAC filter setting manager 34 stores the information concerning the expiring date and time, which is stored in the storage device such as the main memory, into the MAC timer 35 in association with the reconnection SrcMAC address (step S93). The information concerning the expiring date and time, which is stored in the MAC timer 35, is monitored by the MAC filter setting manager 34, and when the expiring date and time arrives, the timeout processing is carried out. The details of the timeout processing will be explained later. Thus, the disconnection processing is completed.

Next, a content of the timeout processing in the authentication apparatus 3 will be explained by using FIG. 13. The timeout processing is a processing carried out when the reconnection SrcMAC address expires.

When the MAC filter setting manager 34 identifies the expired reconnection SrcMAC address, the MAC filter setting manager 34 causes the MAC filter table manager 71 of the gateway 7 to confirm whether or not an entry of the identified reconnection SrcMAC address exists in the MAC learning table storage 74 of the gateway 7 (step S101). When the entry exists (step S101: Yes route), the connection using the reconnection SrcMAC address is presently made. Therefore, the processing ends. On the other hand, when the entry does not exist (step S101: No route), the MAC filter setting manager 34 causes the MAC filter table manager 71 to delete the entry of the identified reconnection SrcMAC address, which is stored in the MAC filter table storage 72 (step S103). By doing so, the MAC filtering unit 73 of the gateway 7 can prevent from passing packets including the identified reconnection SrcMAC address to the network 1 side.

Then, the MAC filter setting manager 34 identifies the allocation flag corresponding to the identified reconnection SrcMAC address from the allocatable SrcMAC address table storage 33, and changes the allocation flag (step S105). Here, the allocation flag is changed from "1" (i.e. "not allocatable") to "0" (i.e. "allocatable") In addition, the MAC filter setting manager 34 identifies the information concerning the expiring date and time for the identified reconnection SrcMAC address, from the MAC timer 35, and deletes the identified information (step S107). Then, the timeout processing ends.

By carrying out the processing in the aforementioned first embodiment, when the user terminal 5 reconnects to the network 1 before the expiring date and time, there is no need to carry out the authentication by the authentication apparatus 3. Therefore, the connection can be made smoothly to the network 1. In addition, in such a case, the authentication apparatus 3 does not need to carry out the authentication processing. Therefore, the load of the authentication apparatus 3 is reduced.

Next, the second embodiment will be explained. The processing relating to the second embodiment has following features: (1) when the authentication request is sent from the user terminal 5 to the authentication apparatus 3, the connection SrcMAC address is transmitted from the authentication apparatus 3 to the user terminal 5, and further before the processing for the disconnection request after the authentication, the reconnection SrcMAC address is transmitted from the authentication apparatus 3 to the user terminal 5, and (2) when the disconnection request is sent from the user terminal 5 to the authentication apparatus 3, the authentication apparatus 3 validates the connection using the reconnection SrcMAC address for a predetermined period. As for the processing of the user terminal 5 and the authentication apparatus 3 for the feature (1), the connection request processing and the authentication processing will be explained later. In addition, as for the processing of the user terminal 5 and the authentication apparatus 3 for the feature (2), the disconnection request processing and the disconnection processing will be explained later.

Figures 13, 14:
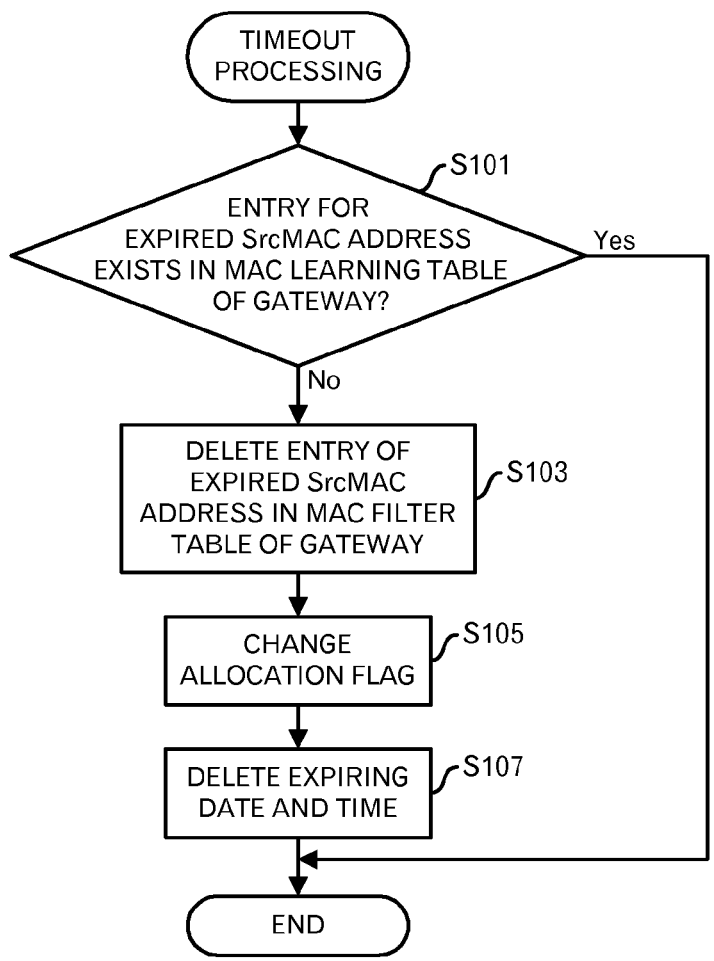
FIG. 13 is a diagram depicting a processing flow of a timeout processing in the first embodiment.
FIG. 14 is a diagram depicting an example of data stored in an allocatable SrcMAC address table storage.

Incidentally, in the second embodiment, not the allocatable SrcMAC address table storage 33 depicted in FIG. 3, but the allocatable SrcMAC address table storage 33 depicted in FIG. 14 is used. In an example of FIG. 14, a table includes a column 1401 of MAC addresses of the terminals, a column 1402 of allocatable SrcMAC addresses and a column 1403 of allocation flags. The MAC address intrinsic to the user terminal 5 is stored in the column 1401 of the MAC addresses of the terminals, while the SrcMAC address is allocated to the user terminal 5 as the connection SrcMAC address or the reconnection SrcMAC address. The MAC addresses allocatable to the user terminal 5 are stored in the column 1402 of the allocatable SrcMAC addresses. The flag representing whether or not the SrcMAC address is allocatable is stored in the column 1403 of the allocation flags, and here, "0" represents "allocatable", "1" represents "not allocatable" (i.e. the address has been allocated as the connection SrcMAC address.), and "2" represents "not allocatable" (i.e. the address has been allocated as the reconnection SrcMAC address.). Incidentally, the SrcMAC address stored in the column 1402 of the allocatable SrcMAC addresses is selected so as not to overlap with the MAC addresses of the terminals, which are stored in the authentication table storage 31 (and the MAC addresses stored in the column 1401 of the MAC addresses of the terminals.).

First, a content of the connection request processing in the user terminal 5 will be explained. However, the explanation for the processing from the beginning of the connection request processing to the terminal A is omitted, because the processing is the same as the processing in FIG. 8, and the processing subsequent to the terminal A will be explained by using FIG. 15.

Figure 15:
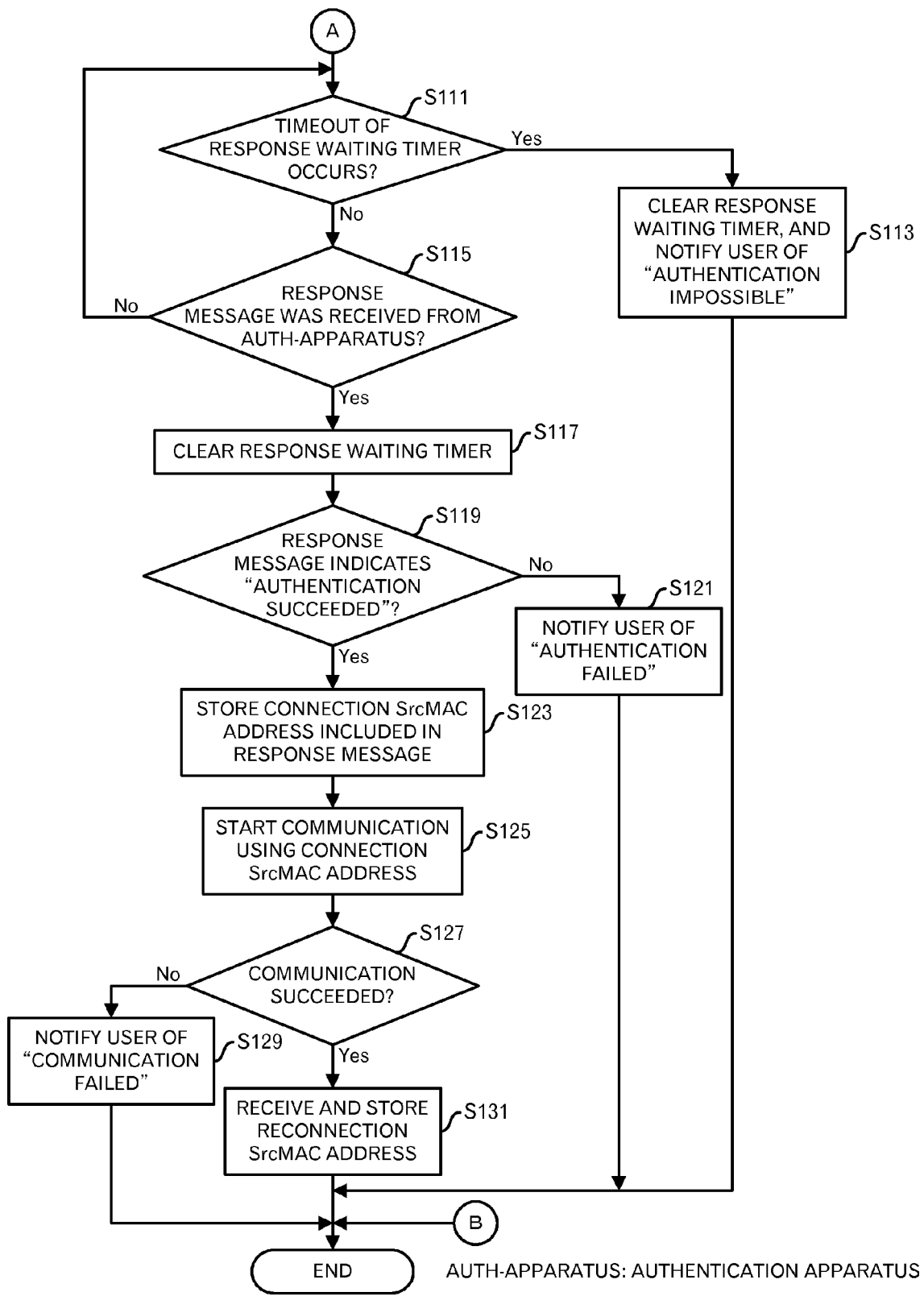
FIG. 15 is a diagram depicting a processing flow of the connection request processing in the second embodiment.

The authentication requesting unit 51 judges whether or not the timeout of the response waiting timer occurs (FIG. 15: step S111). When the timeout of the response waiting timer occurs (step S111: Yes route), the authentication requesting unit 51 clears the response waiting timer, and displays a message representing "authentication impossible" on the display device (step S113), and the processing is terminated. By doing so, the user can recognize that the authentication processing by the authentication apparatus 3 was not successfully carried out.

On the other hand, when the timeout of the response waiting timer does not occur (step S111: No route), the authentication requesting unit 51 judges whether or not a response message including the connection SrcMAC address is received from the authentication apparatus 3 (step S115). When the response has not been received from the authentication apparatus 3 (step S115: No route), the processing returns to the step S111. On the other hand, when the response message has been received from the authentication apparatus 3 (step S115: Yes route), the authentication requesting unit 51 clears the response waiting timer (step S117). When the authentication succeeded, the connection SrcMAC address is a MAC address to be allocated to the user terminal 5 from the authentication apparatus 3, and it becomes possible for the user terminal 5 to communicate with any apparatus on the network 1 side by attaching the MAC address to the transmitted packet.

Then, the authentication requesting unit 51 confirms the content of the response message (step S119). When the content of the response message does not represent "authentication succeeded" (step S119: No route), the authentication requesting unit 51 displays a message representing "authentication failed" on the display device (step S121), and the processing ends. By doing so, the user can recognize the authentication failed. On the other hand, when the content of the response message represents "authentication succeeded" (step S119: Yes route), the authentication requesting unit 51 stores the connection SrcMAC address included in the response message into the storage device such as the main memory (step S123).

Then, the communication manager 53 displays a screen prompting an input of the connection destination, and when the connection destination is designated by the user and the connection is instructed, the communication manager 53 accepts the instruction as a request of the connection to the designated connection designation and transmits a packet including the connection SrcMAC address stored in the storage device such as the main memory to the connection destination designated by the user (step S125).

Then, the communication manager 53 judges whether or not the communication succeeded (step S127). When the communication failed (step S127: No route), the communication manager 53 displays a message representing "communication failed" on the display device (step S129), and the processing ends. Thus, the user can recognize that communication failed due to some errors. On the other hand, when the communication succeeded (step S127: Yes route), namely, when a packet including the communication SrcMAC address is received from the user terminal 5 and the same MAC address is stored in the MAC filter table storage 72, the gateway 7 can pass the packet, and the user terminal 5 can normally connect with the server 9 of the network 1.

Then, the authentication requesting unit 51 receives the reconnection SrcMAC address from the authentication apparatus 3 through a secure path (e.g. SSL), and stores the reconnection SrcMAC address into the reconnection SrcMAC address storage 52 (step S131), and the processing ends. Incidentally, at this stage, the expiring date and time are not set for the reconnection SrcMAC address, and when the present connection is disconnected, the expiring date and time will be set. The details of this processing will be explained later. Thus, the content of the connection request processing in the user terminal 5 has been explained.

Figure 16:
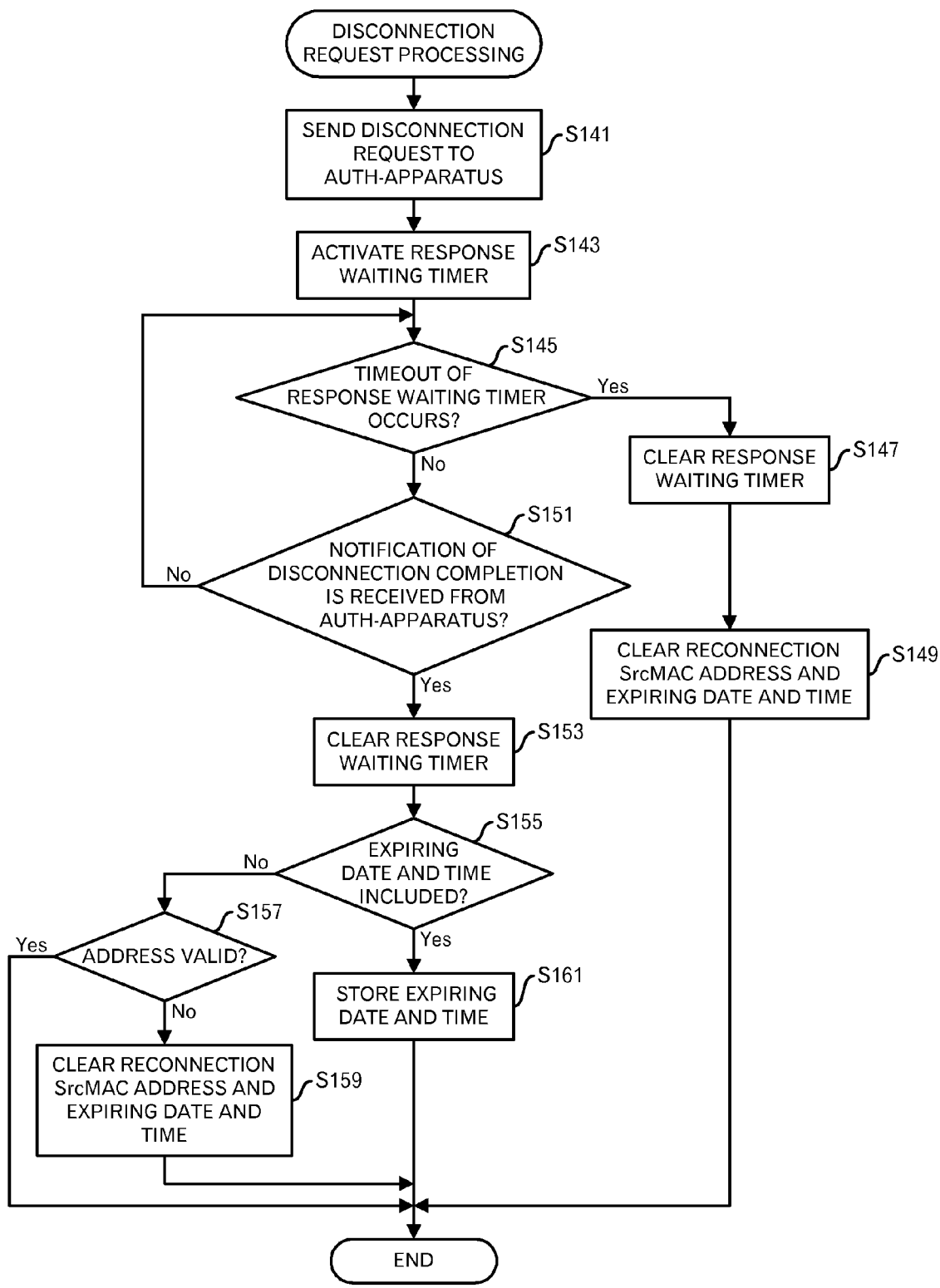
FIG. 16 is a diagram depicting a processing flow of the disconnection request processing in the second embodiment.

Next, a content of the disconnection request processing in the user terminal 5 will be explained by using FIG. 16. First, when the authentication requesting unit 51 of the user terminal 5 accepts an instruction of the disconnection from the user during the connection with the network 1, the authentication requesting unit 51 transmits a disconnection request to the authentication apparatus 3 (FIG. 16: step S141). As described later, the authentication apparatus 3 carries out a processing to notify the user terminal 5 of the completion of the disconnection. Then, the authentication requesting unit 51 activates the response waiting timer, and waits a response from the authentication apparatus 3 (step S143).

Then, the authentication requesting unit 51 judges whether or not the timeout of the response waiting timer occurs (step S145). When the timeout of the response waiting timer occurs (step S145: Yes route), the authentication requesting unit 51 clears the response waiting timer (step S147). Furthermore, the authentication requesting unit 51 deletes the reconnection SrcMAC address and the information concerning the expiring date and time, which are stored in the reconnection SrcMAC address storage 52 (step S149), and the processing ends. This is to carry out the authentication again at the next connection when the disconnection was not normally carried out. However, when the connection was made by using the connection SrcMAC address allocated at the authentication, the reconnection SrcMAC address and the information concerning the expiring date and time are not stored in the reconnection SrcMAC address storage 52. Therefore, the processing at the step S149 is skipped.

On the other hand, when the timeout of the response waiting timer does not occur (step S145: No route), the authentication requesting unit 51 judges whether or not a notification of the completion of the disconnection has been received from the authentication apparatus 3 (step S151). When the notification has not been received (step S151: No route), the processing returns to the step S145. On the other hand, the notification has been received (step S151: Yes route), the authentication requesting unit 51 stores the notification of the completion of the disconnection into the storage device such as the main memory, and clears the response waiting timer (step S153).

Then, the authentication requesting unit 51 judges whether or not the notification of the completion of the disconnection includes the information concerning the expiring date and time (step S155). When the notification includes the information concerning the expiring date and time (step S155: Yes route), the user terminal 5 is connecting by using the connection SrcMAC address allocated at the authentication and the expiring data and time is not set for the reconnection SrcMAC address. Therefore, the authentication requesting unit 51 stores the information concerning the expiring date and time into the reconnection SrcMAC address storage 52 (step S161), and the processing ends.

On the other hand, when the notification does not include the information concerning the expiring date and time (step S155: No route), the user terminal 5 is connecting by using the reconnection SrcMAC address. Therefore, the authentication requesting unit 51 checks the information concerning the expiring date and time, which is stored in the reconnection SrcMAC address storage 52, and judges whether or not the expiring date and time arrives (step S157). When the expiring date and time does not arrive (step S157: Yes route), the reconnection SrcMAC address is still valid. Therefore, the processing ends.

Incidentally, when the expiring date and time does not arrive, the same MAC address as the reconnection SrcMAC address is stored in the MAC filter table storage 72 of the gateway 7. Therefore, the packet including that MAC address can pass through the gateway 7 without filtering of the MAC filtering unit 73, and the user terminal 5 can normally connect with the server 9 on the network 9. In addition, the SrcMAC address allocated to the user terminal 5 as the reconnection SrcMAC address is managed in the allocatable SrcMAC address table storage 33 and is selected so as not to overlap with the SrcMAC addresses allocated to other user terminals and the MAC addresses, which are intrinsic to the terminals and stored in the authentication table storage 31. The details will be explained later.

On the other hand, when the reconnection SrcMAC address expires (step S157: No route), the authentication requesting unit 51 deletes the reconnection SrcMAC address and the information concerning the expiring date and time, which are stored in the reconnection SrcMAC address storage 52 (step S159), because the reconnection SrcMAC address is invalid. Then, the processing ends. The disconnection request processing in the user terminal 5 has been completed as described above.

Figure 17:
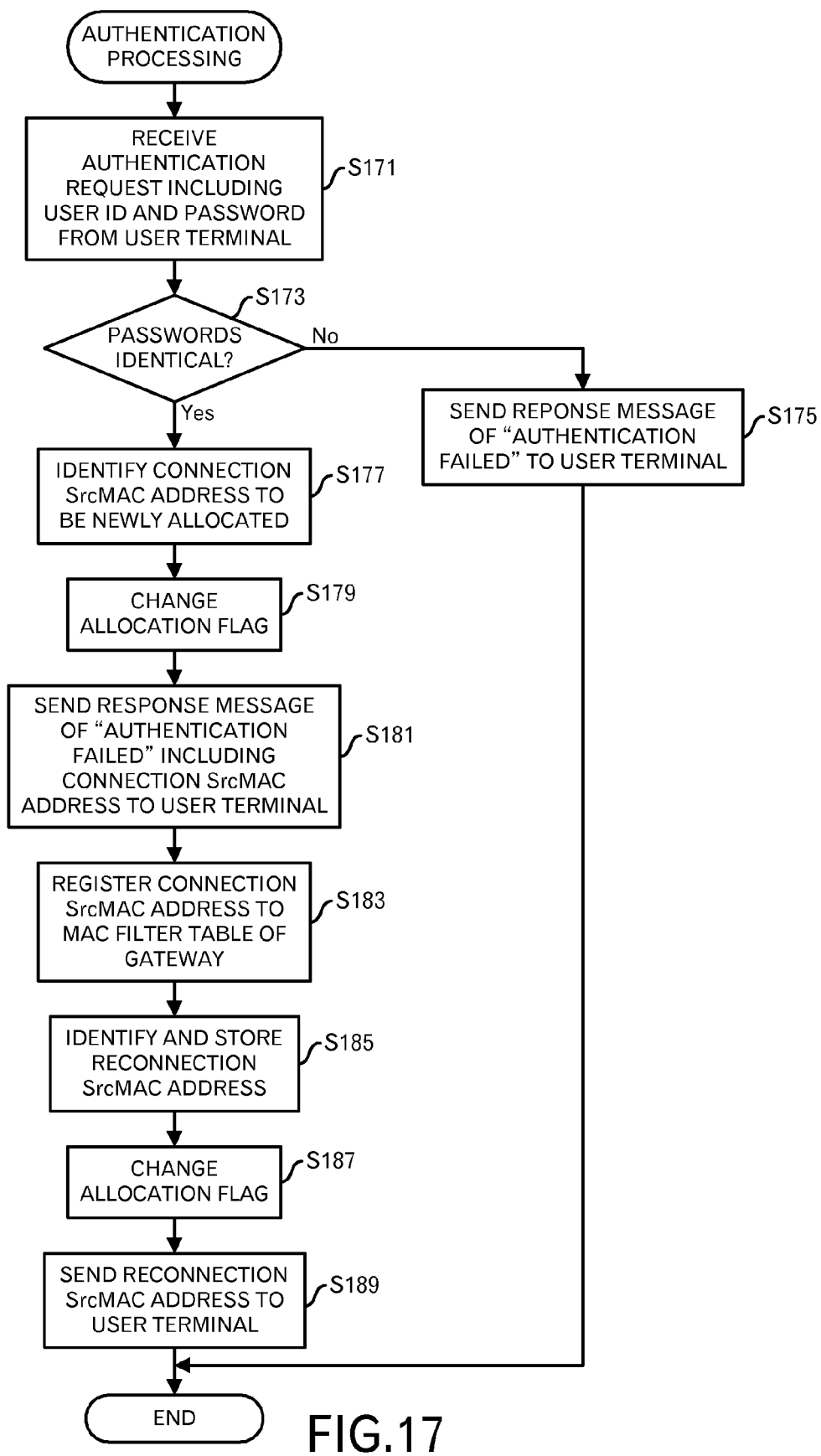
FIG. 17 is a diagram depicting a processing flow of the authentication processing in the second embodiment.

Next, a content of the authentication processing in the authentication apparatus 3 will be explained by using FIG. 17. First, the authentication processor 32 of the authentication apparatus 3 receives an authentication request including the user ID and password from the user terminal 5, and stores the request into the storage device such as the main memory (FIG. 17: step S171). Then, the authentication processor 32 identifies a password registered in association with the received user ID in the authentication table storage 31, and judges whether or not the received password is identical with the identified password (step S173). When the received password is not identical with the identified password (step S173: No route), the authentication processor 32 transmits a response message representing "authentication failed" to the user terminal 5 (step S175), and the processing ends.

On the other hand, when it is judged that the received password is identical with the identified password (step S173: Yes route), the authentication processor 32 identifies one allocatable SrcMAC address stored in the allocatable SrcMAC address table storage 33, and stores the identified SrcMAC address into the storage device such as the main memory (step S177). Here, the allocation flags are checked to identify one SrcMAC address with the allocation flag being "0" (i.e. allocatable), as the connection SrcMAC address. In addition, the authentication processor 32 changes the allocation flag corresponding to the identified SrcMAC address to "1" (i.e. not allocatable because it has been allocated as the connection SrcMAC address), and stores the MAC address of the user terminal 5, which is included in the authentication request, in association with the identified SrcMAC address (step S179). Then, the authentication processor 32 transmits a response message, which represents "authentication succeeded", and includes the identified connection SrcMAC address, to the user terminal 5 (step S181).

Incidentally, at the step S173, in addition to the confirmation of whether or not the passwords are identical, it may be confirmed whether or not the MAC address, which is intrinsic to the user terminal 5 and included in the authentication request, is identical with the MAC address of the terminal, which is stored in the authentication table storage 31 in association with the received user ID. This is to allocate the connection SrcMAC address or the like only to the user terminal, which is previously registered. In addition, the authentication apparatus 3 manages the MAC address intrinsic to the user terminal 5 by using the authentication table storage 31 so as not to allocate the MAC address identical with the MAC address intrinsic to the user terminal 5, as the SrcMAC address.

Then, the MAC filter setting manager 34 of the authentication apparatus 3 instructs the MAC filter table manager 71 of the gateway 7 to register the connection SrcMAC address stored in the storage device such as the main memory into the MAC filter table storage 72, and the MAC filter table manager 71 registers the connection SrcMAC address into the MAC filter table (step S183). Thus, the MAC filtering unit 73 of the gateway 7 passes packets including the connection SrcMAC address to the network 1 side.

After that, at an arbitrary timing by the receipt of the disconnection request after the step S183, the authentication processor 32 of the authentication apparatus 3 identifies one allocatable SrcMAC address stored in the allocatable Src-MAC address table storage 33, and stores the identifies Src-MAC address into the storage device such as the main memory (step S185). Here, the allocation flags are checked to identify one SrcMAC address with the allocation flag being "0" (i.e. "allocatable") as the reconnection SrcMAC address. In addition, the allocation flag corresponding to the identified SrcMAC address is changed to "2" (i.e. not allocatable because the address has been allocated as the reconnection SrcMAC address.), and the authentication processor 32 stores the MAC address of the user terminal 5, which is included in the authentication request, in association with the reconnection SrcMAC address (step S187).

Then, the authentication processor 32 transmits the identified reconnection SrcMAC address to the user terminal 5 through the secure path (e.g. SSL) (step S189), and the processing ends. Thus, the authentication processing has been completed in the authentication apparatus 3.

Figure 18:
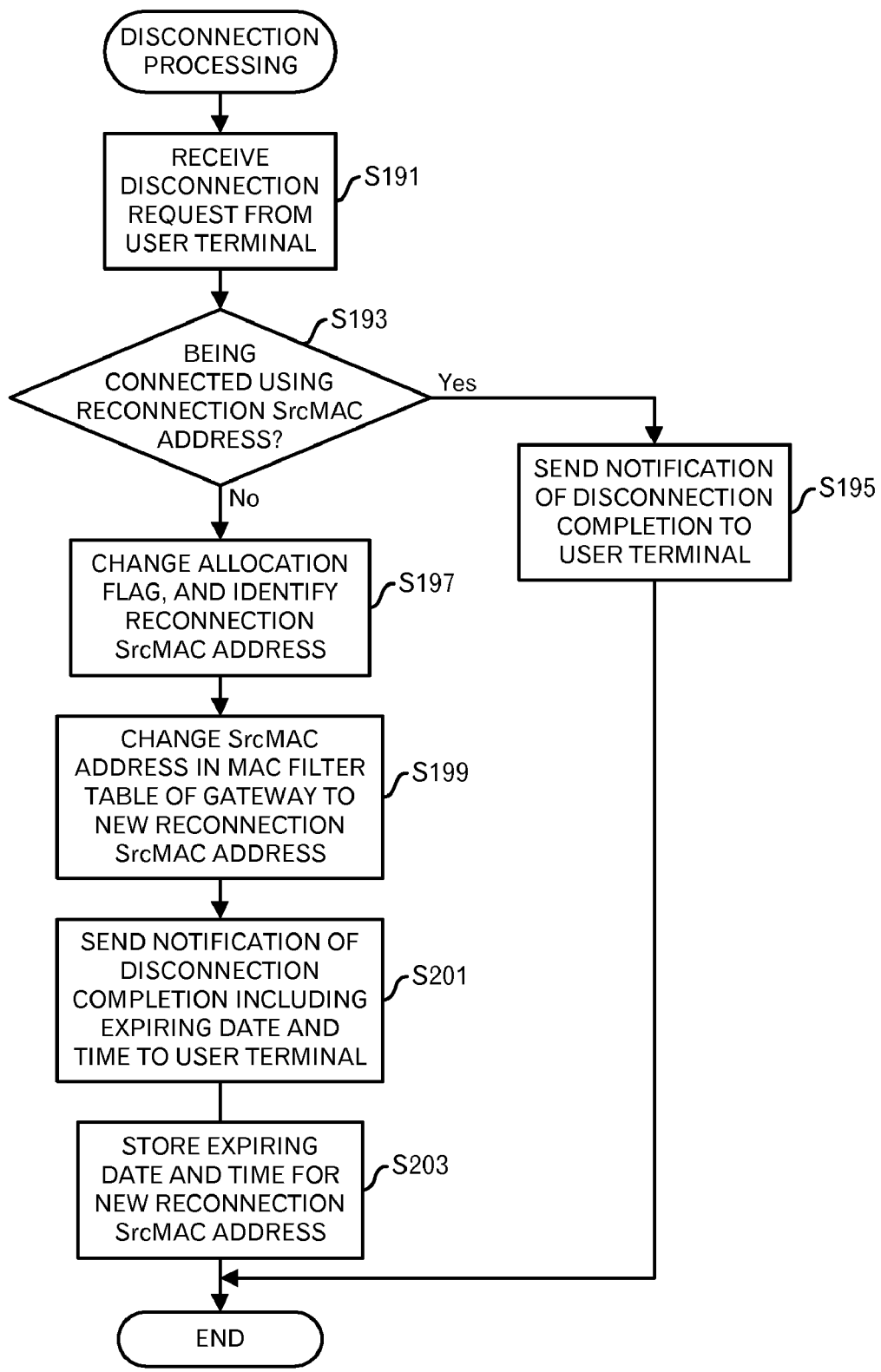
FIG. 18 is a diagram depicting a processing flow of the disconnection processing in the second embodiment.

Next, a content of the disconnection processing in the authentication apparatus 3 will be explained by using FIG. 18. First, the authentication processor 32 of the authentication apparatus 3 receives the disconnection request from the user terminal 5, and stores the request into the storage device such as the main memory (FIG. 18: step S191). Then, the authentication processor 32 checks the allocatable SrcMAC address table storage 33, and judges whether or not the allocation flag corresponding to the SrcMAC address of the user terminal 5, which is included in the disconnection request, represents "2" (i.e. the received SrcMAC address is the reconnection SrcMAC address) (step S193). When the received SrcMAC address is the reconnection SrcMAC address (step S193: Yes route), the authentication processor 32 transmits a notification of the completion of the disconnection to the user terminal 5 (step S195), and the processing ends. When the reconnection SrcMAC address expires, the timeout processing described in FIG. 13 is carried out, and when the reconnection SrcMAC address dose not expire, the reconnection SrcMAC address is still valid.

On the other hand, when the received SrcMAC address is not the reconnection SrcMAC address (step S193: No route), the user terminal 5 is now connecting by using the connection SrcMAC address allocated at the authentication. Therefore, the authentication processor 32 changes the allocation flag corresponding to the received SrcMAC address from "1" (i.e. not allocatable because the SrcMAC address has been allocated as the connection SrcMAC address.) to "0" (i.e. allocatable) in the allocatable SrcMAC address table storage 33, and deletes the MAC address of the user terminal, which is stored in association with the received SrcMAC address in the allocatable SrcMAC address table storage 33. In addition, the authentication processor 32 identifies the reconnection SrcMAC address stored in the allocatable SrcMAC address table storage 33 in association with the MAC address of the user terminal 5, and stores the reconnection SrcMAC address into the storage device such as the main memory (step S197).

Then, the MAC filter setting manager 34 of the authentication apparatus 3 instructs the MAC filter table manager 71 of the gateway 7 to change the connection SrcMAC address, which is included in the disconnection request stored in the storage device such as the main memory and is registered in the MAC filter table storage 72, to the reconnection SrcMAC address stored in the storage device such as the main memory, and the MAC filter table manager 71 updates the MAC filter table (step S199). Thus, the MAC filtering unit 73 of the gateway 7 passes packets including the reconnection Src-MAC address to the network 1 side.

Furthermore, the authentication processor 32 of the authentication apparatus 3 generates information concerning the expiring date and time and stores the information into the storage device such as the main memory, and further transmits a notification of the completion of the disconnection, which includes the information concerning the expiring date and time to the user terminal 5 (step S201).

Then, the MAC filter setting unit 34 of the authentication apparatus 3 stores the information concerning the expiring date and time, which is stored in the storage device such as the main memory, into the MAC timer 35 in association with the reconnection SrcMAC address stored in the storage device such as the main memory (step S203), and the processing ends. Thus, the disconnection processing has been completed.

By carrying out the processing of the second embodiment as described above, it is possible to obtain the same effect as that of the first embodiment, and further because the processing to allocate the reconnection SrcMAC address, which is carried out by the authentication apparatus 3, is carried out before the processing for the disconnection request after the authentication was completed, the load of the authentication apparatus 3 is reduced at the receipt of the disconnection request. Incidentally, it is possible to allocate the reconnection SrcMAC address at an arbitrary timing before the processing for the disconnection request after the authentication was completed. However, because the authentication apparatus 3 cannot know the timing when the disconnection request will be transmitted, it is preferable that the allocation of the reconnection SrcMAC address is carried out immediately after the authentication is completed, in order to surely carry out the processing. However, even after the receipt of the disconnection request, the allocation of the reconnection SrcMAC address may be inserted immediately before the processing for the disconnection request is carried out.

Next, the third embodiment will be explained. The processing relating to the third embodiment has following features: (1) when the authentication request is sent from the user terminal 5 to the authentication apparatus 3, the connection SrcMAC address is transmitted from the authentication apparatus 3 to the user terminal 5, and (2) when the disconnection request is sent from the user terminal 5 to the authentication apparatus 3, the user terminal 5 and the authentication apparatus 3 respectively generate the reconnection SrcMAC address, which is valid for a predetermined period. The feature (1) is the same as that of the first embodiment. Therefore, the explanation of the feature (1) is omitted. Here, as the processing of the user terminal 5 and the authentication apparatus 3 for the feature (2), the disconnection request processing and the disconnection processing will be explained later.

Figure 19:
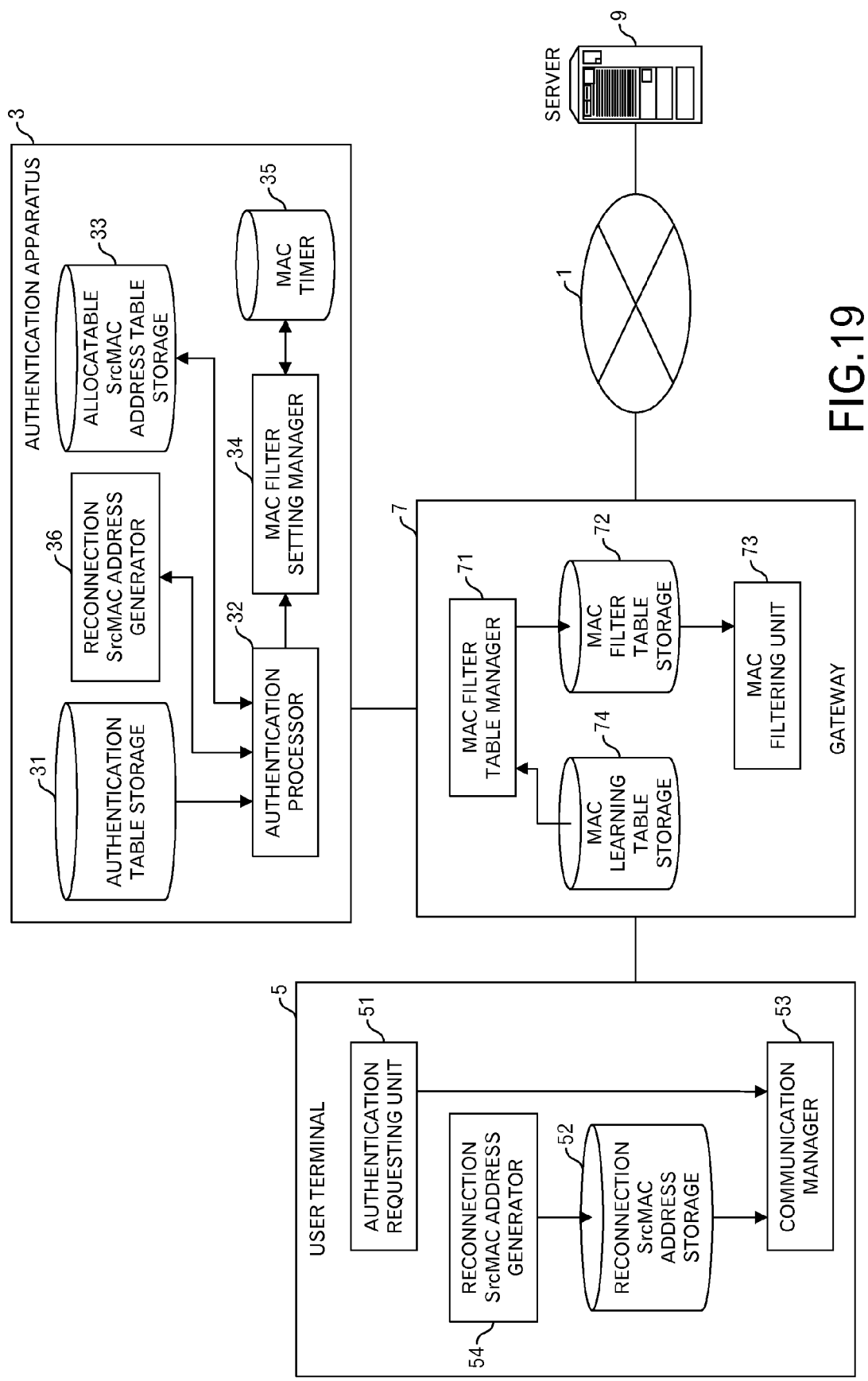
FIG. 19 is a functional block diagram of a system relating to third and fourth embodiments.

First, a system outline diagram relating to the third and fourth embodiments is depicted in FIG. 19. The system relating to the third and fourth embodiments includes the network 1, the authentication apparatus 3, the user terminal 5, the gateway 7 and the server 9, similar to the system relating to the first and second embodiments. However, the authentication apparatus 3 further includes a reconnection SrcMAC address generator 36, and the user terminal 5 has a reconnection SrcMAC address generator 54.

The reconnection SrcMAC address generator 36 of the authentication apparatus 3 generates the reconnection Src-MAC address by carrying out computation using shared information of the session (e.g. identifier information in the IP header of the packet from the user terminal 5 at the authentication request) and a key (e.g. secret key) common to the user terminal 5. The key is shared among the authentication apparatus 3 and the user terminal 5 by securely delivering the key from the authentication apparatus 3 to the user terminal 5 via a key exchange protocol (e.g. Internet Key Exchange (IKE)). Or, the key may be exchanged via off-line. The reconnection SrcMAC address generator 54 of the user terminal 5 has the substantially same function as the reconnection SrcMAC address generator 36.

Figure 20:
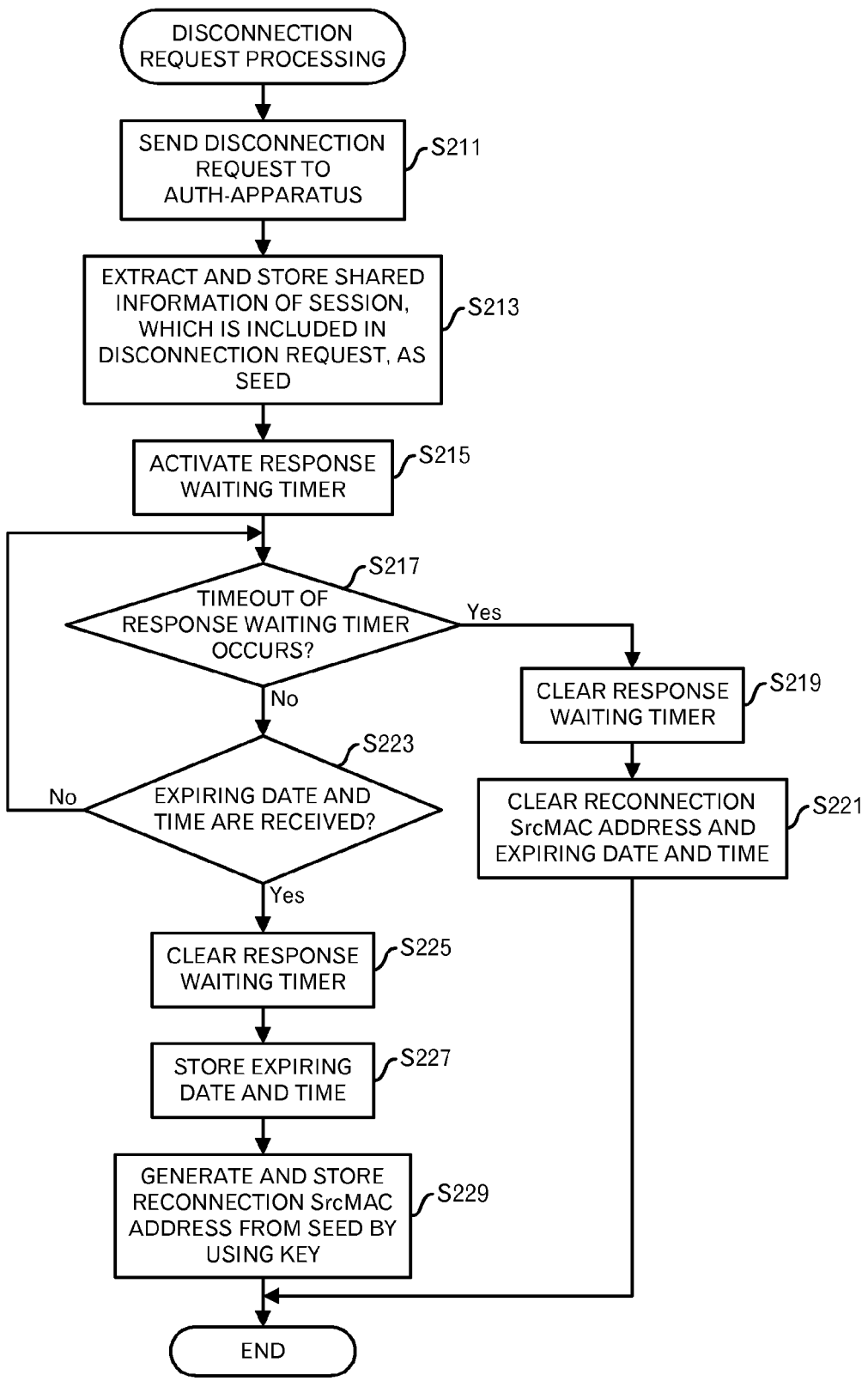
FIG. 20 is a diagram depicting a processing flow of the disconnection request processing in the third embodiment.

Next, a content of the disconnection request processing in the user terminal 5 will be explained by using FIG. 20. First, when the authentication requesting unit 51 of the user terminal 5 accepts an instruction of the disconnection from the user during the connection with the network 1, and transmits the disconnection request to the authentication apparatus 3 (FIG. 20: step S211). As described above, the authentication apparatus 3 carries out a processing to transmit information concerning the expiring date and time to the user terminal 5. Then, the authentication requesting unit 51 extracts specific information included in the disconnection request, and stores the specific information into the storage device such as the main memory (step S213). The specific information is identifier information in the IP header of the packet relating to the disconnection request. As described later, the specific information is used as a seed when the reconnection SrcMAC address is generated.

Then, the authentication requesting unit 51 activates the response waiting timer, and waits a response from the authentication apparatus 3 (step S215). After that, the authentication requesting unit 51 judges whether or not the timeout of the response waiting timer occurs (step S217). When the timeout of the response waiting timer occurs (step S217: Yes route), the authentication requesting unit 51 clears the response waiting timer (step S219). Furthermore, the authentication requesting unit 51 deletes the reconnection SrcMAC address and the information concerning the expiring date and time, which are stored in the reconnection SrcMAC address storage 52 (step S221), and the processing ends. In a case where the disconnection was not normally carried out, when the next connection is made, the authentication is executed again. However, when the connection was made using the connection SrcMAC address allocated at the authentication, the reconnection SrcMAC address and the information concerning the expiring date and time are not stored in the reconnection SrcMAC address storage 52. Therefore, the processing of the step S221 is skipped.

On the other hand, when the timeout of the response waiting timer does not occur (step S217: No route), the authentication requesting unit 51 judges whether or not the information concerning the expiring date and time has been received from the authentication apparatus 3 (step S223). When the information concerning the expiring date and time has not been received (step S223: No route), the processing returns to the step S217. On the other hand, when the information concerning the expiring date and time has been received (step S223: Yes route), the authentication requesting unit 51 clears the response waiting timer (step S225). Then, the authentication requesting unit 51 stores the information concerning the expiring date and time into the reconnection SrcMAC address storage 52 (step S227).

Then, the reconnection SrcMAC address generator 54 of the user terminal 5 carries out computation using the specific information stored in the storage device such as the main memory as a seed and a predetermined key to generate and store into the reconnection SrcMAC address storage 52, the reconnection SrcMAC address (step S229), and the processing ends. In this embodiment, an algorithm of the computation is designed to generate the reconnection SrcMAC address without overlapping with the MAC addresses intrinsic to the user terminals (i.e. MAC addresses of the terminals, which are stored in the authentication table storage 31) and the SrcMAC addresses stored in the allocatable SrcMAC address table storage 33. In addition, because the seed, the predetermined key and the computation algorithm, which are used when the user terminal 5 generates the reconnection SrcMAC address, are common to those of the authentication apparatus 3, the same reconnection SrcMAC address is respectively generated by the user terminal 5 and the authentication apparatus 3. Thus, the disconnection request processing has been completed in the user terminal 5.

Incidentally, when the expiring date and time does not arrive, the same MAC address as the generated reconnection SrcMAC address is stored in the MAC filter table storage 72 of the gateway 7. Therefore, the packet including that MAC address can pass through the gateway 7 without filtering by the MAC filtering unit 73, and the user terminal 5 can normally connect with the server 9 on the network 1.

Next, a content of the disconnection processing in the authentication apparatus 3 will be explained by using FIG. 21. Incidentally, in this embodiment, although the SrcMAC address, which is allocatable as the connection ScrMAC address at the authentication, is stored in the column 1402 of the allocatable SrcMAC addresses in the allocatable SrcMAC address table storage 33, the generated reconnection SrcMAC address is also stored in the column 1402 of the allocatable SrcMAC addresses, temporarily, while it is allocated to the user terminal. In addition, as explained above, the MAC address intrinsic to the user terminal is stored in the column 1401 of the MAC addresses of the terminals, while the SrcMAC address is allocated to the user terminal. Then, "0" of the allocation flag represents "allocatable", "1" of the allocation flag represents "not allocatable" (i.e. being allocated as the connection SrcMAC address), and "2" of the allocation flag represents "not allocatable" (i.e. being allocated as the reconnection SrcMAC address).

Figure 21:
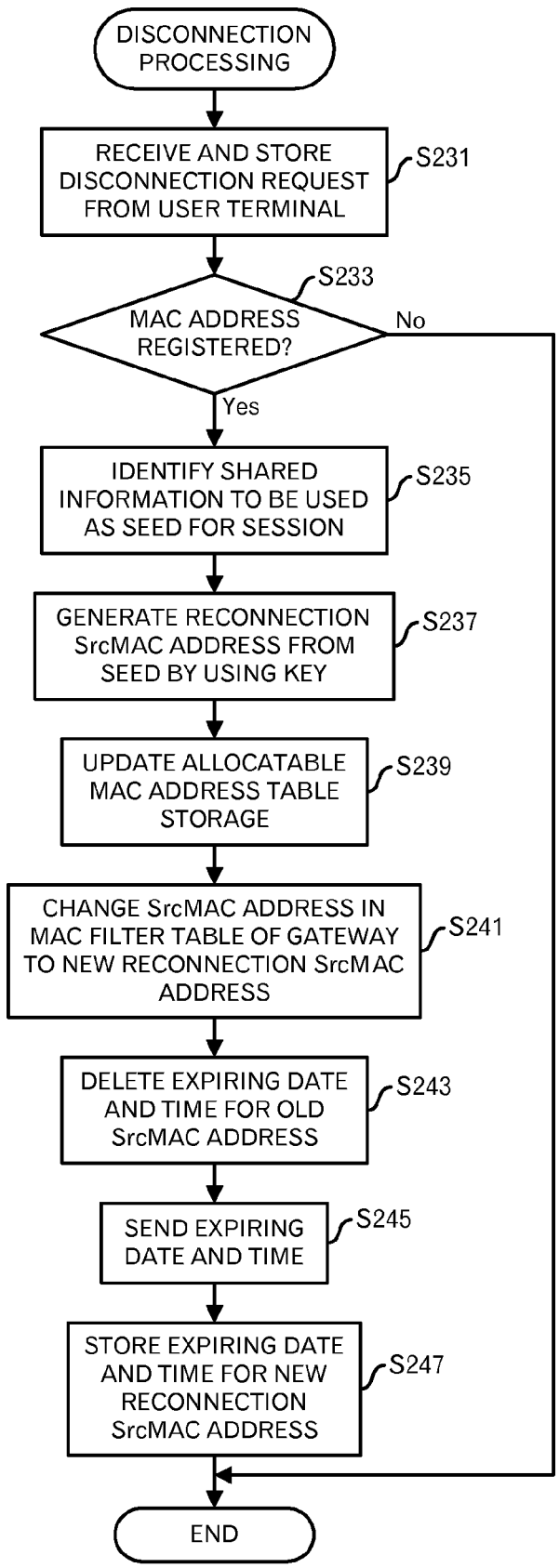
FIG. 21 is a diagram depicting a processing flow of the disconnection processing in the third embodiment.

First, the authentication processor 32 of the authentication apparatus 3 receives the disconnection request from the user terminal 5, and stores the request into the storage device such as the main memory (FIG. 21: step S231). Then, the authentication processor 32 judges whether or not the MAC address included in the disconnection request (i.e. the SrcMAC address currently used by the user terminal 5) is stored in the allocatable SrcMAC address table storage 33 (step S233). When the MAC address is not stored (step S233: No route), the processing ends. Here, when the MAC address included in the disconnection request is not stored in the allocatable SrcMAC address storage 33, this MAC address is not the connection SrcMAC address allocated at the authentication, and is not the reconnection SrcMAC address generated at the disconnection request after the authentication. Therefore, this request is the disconnection request from the user terminal, which has not been authenticated, and the reconnection SrcMAC address is not allocated.

On the other hand, when the MAC address is stored (step S233: Yes route), the authentication processor 32 extracts the specific information included in the disconnection request, and stores the specific information into the storage device such as the main memory (step S235). The specific information is the same as the information extracted at the step S213 of FIG. 20 by the user terminal 5.

Then, the reconnection SrcMAC address generator 36 of the authentication apparatus 3 carries out computation using the specific information stored in the storage device such as the main memory as the seed and the predetermined key to generate the reconnection SrcMAC address, and stores the generated reconnection SrcMAC address into the storage device such as the main memory (step S237). Similar to the step S229 of FIG. 20, the computation algorithm is designed so that the reconnection SrcMAC address does not overlap with the MAC addresses intrinsic to the user terminals (i.e. MAC addresses of the terminals, which are stored in the authentication table storage 31) and the allocated SrcMAC addresses stored in the allocatable SrcMAC address table storage 33. In addition, because the seed, predetermined key and computation algorithm, which are used when the reconnection SrcMAC address is generated by the authentication apparatus 3, are the same as those used by the user terminal 5, the same reconnection SrcMAC address is generated by the user terminal 5 and the authentication apparatus 3.

Then, the authentication processor 32 identifies a record including the MAC address (i.e. SrcMAC address currently used by the user terminal 5) included in the disconnection request from the allocatable SrcMAC address table storage 33, updates the identified record, and stores a record including the reconnection SrcMAC address stored in the storage device such as the main memory and the MAC address intrinsic to the user terminal 5 (step S239). At the step S239, when the allocation flag for the MAC address (i.e. the SrcMAC address currently used by the user terminal) included in the disconnection request represents "2", the MAC address is the reconnection SrcMAC address. Therefore, the record including that MAC address is deleted from the allocatable SrcMAC address table storage 33. And, when the allocation flag represents "1", the MAC address is the connection SrcMAC address. Therefore, the flag is changed from "1" to "0" (i.e. allocatable). In addition, the allocation flag for the newly stored record represents "2" (i.e. not allocatable because it has been allocated as the reconnection SrcMAC address.).

Then, the MAC filter setting manager 34 of the authentication apparatus 3 instructs the MAC filter table manager 71 of the gateway 7 to change the MAC address, which is included in the disconnection request stored in the storage device such as the main memory and is also registered in the MAC filter table storage 72, to the reconnection SrcMAC address stored in the storage device such as the main memory, and the MAC filter table manager 71 changes the MAC filter table (step S241). Thus, the MAC filtering unit 73 of the gateway 7 passes packets including the reconnection SrcMAC address to the network 1 side.

Furthermore, the MAC filter setting manager 34 of the authentication apparatus 3 deletes the information concerning the expiring date and time for the MAC address included in the disconnection request stored in the storage device such as the main memory, from the MAC timer 35 (step S243). However, when the information concerning the expiring date and time for the MAC address of the user terminal, which is included in the disconnection request, is not stored in the MAC timer 35, namely, when the MAC address is the connection SrcMAC address allocated at the authentication, the processing of the step S243 is skipped.

Then, the authentication processor 32 generates the information concerning the expiring date and time for the reconnection SrcMAC address, stores the information into the storage device such as the main memory, and transmits the information concerning the expiring date and time to the user terminal 5 (step S245).

Then, the MAC filter setting manager 34 stores the information concerning the expiring date and time, which is stored in the storage device such as the main memory, into the MAC timer 35 in association with the reconnection SrcMAC address (step S247). The information concerning the expiring date and time, which is stored in the MAC timer 35, is monitored by the MAC filter setting manager 34, and when the expiring date and time arrives, the timeout processing is carried out. Thus, the disconnection processing has been completed.

By carrying out the aforementioned processing of the third embodiment, the same effect as that of the processing of the first embodiment can be obtained. Furthermore, because the reconnection SrcMAC address is not transmitted from the authentication apparatus 3 to the user terminal 5 and the reconnection SrcMAC address is generated independently by the user terminal 5, the security is improved. Incidentally, in the aforementioned example of this embodiment, one connection SrcMAC address is selected and allocated at the authentication, among the connection SrcMAC addresses prepared in advance, and the reconnection SrcMAC address is generated at the disconnection. However, the reconnection SrcMAC address may be generated at the authentication. Namely, the connection SrcMAC address and the reconnection SrcMAC address may not be distinguished.

Next, the fourth embodiment will be explained. The processing relating to the fourth embodiment includes following features: (1) when the authentication request is sent from the user terminal 5 to the authentication apparatus 3, the connection SrcMAC address is transmitted from the authentication apparatus 3 to the user terminal 5, and before the processing for the disconnection request after the authentication, the reconnection SrcMAC address is generated respectively by the user terminal 5 and the authentication apparatus 3, and (2) when the disconnection request is sent from the user terminal 5 to the authentication apparatus 3, the authentication apparatus 3 validates the connection using the reconnection SrcMAC address for a predetermined period. The feature (2) is the same as that of the second embodiment. Therefore, the explanation is omitted. In the following, the connection request processing and the authentication processing will be explained as the processing by the user terminal 5 and the authentication processing 3 for the feature (1).

Figure 22:
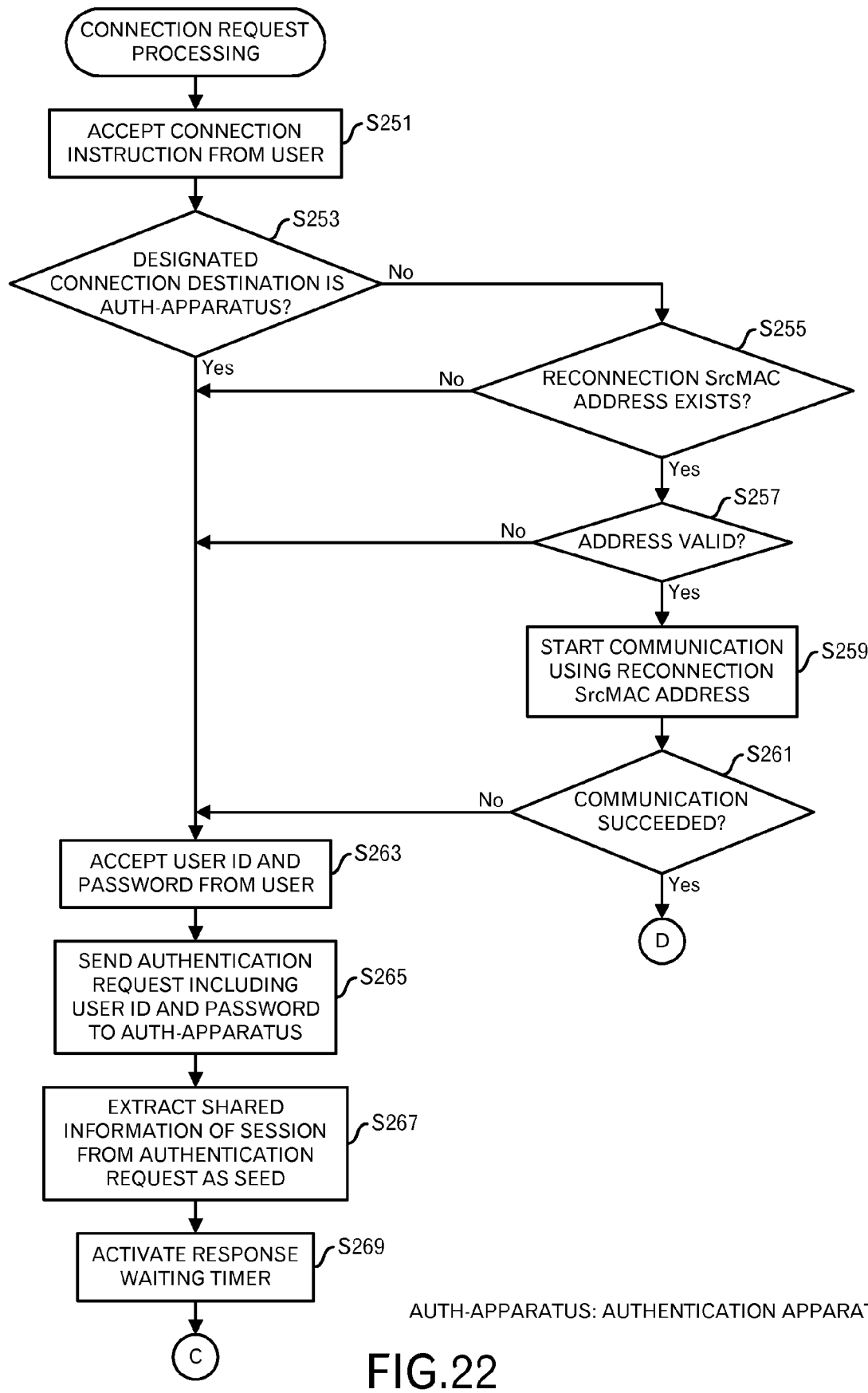
FIG. 22 is a diagram depicting a processing flow of the connection request processing in the fourth embodiment.
Figure 23:
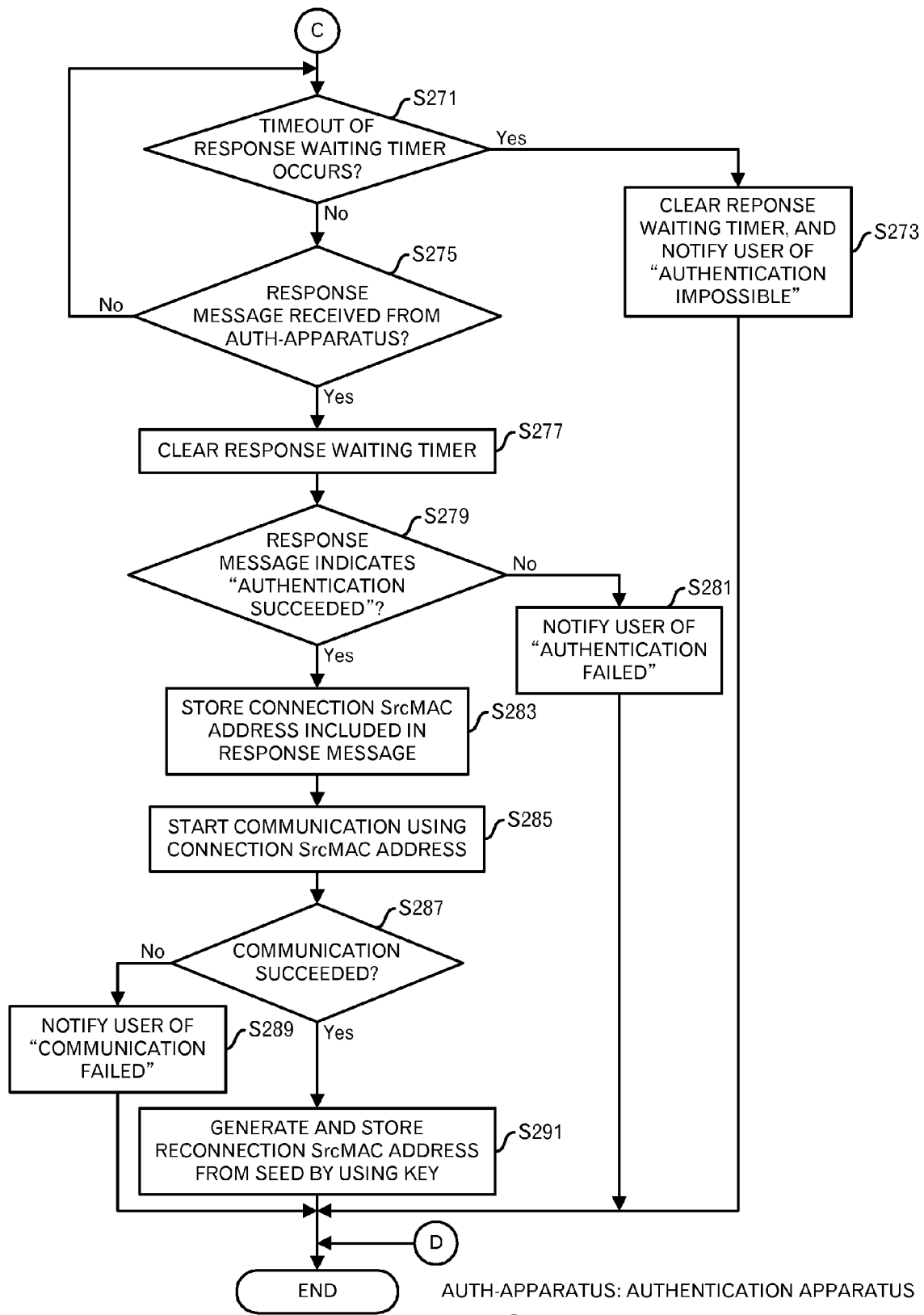
FIG. 23 is a diagram depicting a processing flow of the connection request processing in the fourth embodiment.

First, a content of the disconnection request processing in the user terminal 5 will be explained by using FIGS. 22 and 23. The communication manager 53 of the user terminal 5 displays a screen prompting a connection instruction on the display device in response to an instruction from the user, and when the connection instruction including designation of the connection designation is inputted from the user, the communication manager 53 accepts the connection instruction (FIG. 22: step S251). Then, the communication manager 53 judges whether or not the designated connection destination is the authentication apparatus 3 (step S253). When the designated connection destination is the authentication apparatus 3 (step S253: Yes route), the authentication requesting unit 51 of the user terminal 5 displays a screen prompting an input of the user ID and password on the display device, and when the user ID and password are inputted from the user and the transmission is instructed, the authentication requesting unit 51 accepts the instruction as the authentication request (step S263).

Then, the authentication requesting unit 51 transmits the authentication request including the user ID and password to the authentication apparatus 3 (step S265). When the gateway 7 receives the authentication request, the gateway 7 relays the authentication request to the authentication apparatus 3, and the authentication apparatus 3 receives the authentication request to carry out the authentication processing and the like. The details will be explained later.

Then, the authentication requesting unit 51 extracts specific information included in the authentication request, and stores the specific information into the storage device such as the main memory (step S267). The specific information is identifier information in the IP header of the packet relating to the authentication request. As described later, the specific information is used as a seed when generating the reconnection SrcMAC address.

Then, the authentication requesting unit 51 activates the response waiting timer, and waits the response message from the authentication apparatus 3 (step S269). The processing shifts to step S271 of FIG. 23 through a terminal C.

On the other hand, when the designated connection destination is not the authentication apparatus 3 (step S253: No route), there is possibility that the reconnection is requested within a short time. Therefore, the communication manager 53 confirms whether or not the reconnection SrcMAC address is stored in the reconnection SrcMAC address storage 52 (step S255). When the reconnection SrcMAC address is not stored in the reconnection SrcMAC address storage 52 (step S255: No route), the authentication by the authentication apparatus 3 is executed. Therefore, the processing shifts to step S263.

On the other hand, when the reconnection SrcMAC address is stored in the reconnection SrcMAC address storage 52 (step S255: Yes route), it is judged whether or not the user terminal 5 can connect to the network 1 without the authentication. Therefore, the communication manager 53 confirms the information concerning the expiring date and time, which is stored in the reconnection SrcMAC address storage 52 (step S257). As described later, when the disconnection was normally carried out, the reconnection SrcMAC address and the information concerning the expiring date and time ought to be stored in the reconnection SrcMAC address storage 52. Then, when the reconnection SrcMAC address expires (step S257: No route), the communication manager 53 deletes the reconnection SrcMAC address and the information concerning the expiring date and time, and the processing shifts to the step S263. The reconnection SrcMAC address becomes invalid when a predetermined period elapses. Therefore, the authentication by the authentication apparatus 3 is executed again.

On the other hand, when the reconnection SrcMAC address does not expire (step S257: Yes route), the communication manager 53 transmits a packet including the reconnection SrcMAC address to the designated connection destination (e.g. server 9) (step S259). Then, the communication manager 53 judges whether or not the communication succeeded (step S261). When the communication failed (step S261: No route), the processing shifts to the step S263. When the communication failed due to some errors, the authentication by the authentication apparatus 3 is executed. On the other hand, when the communication succeeded (step S261: Yes route), namely, when the gateway 7 receives the packet including the reconnection SrcMAC address from the user terminal 5 and the same MAC address is stored in the MAC filter table storage 72, the gateway 7 can pass the packet, and the user terminal 5 can normally connect to the server 9 on the network 1. Therefore, the processing shifts to the processing of FIG. 23 through a terminal D, and further ends. Thus, when the reconnection SrcMAC address is valid, there is no need for the user to manually input the authentication information (e.g. the user ID and password), and the user terminal 5 can be simply connected with the network 1.

Incidentally, when the user terminal 5 carries out the reconnection, the reconnection SrcMAC address (i.e. new MAC address) different from the SrcMAC address (i.e. old MAC address), which was used before, is used for the communication after the reconnection. In such a case, a computer (e.g. server 9), which communicates with the user terminal 5, does not know the new MAC address of the user terminal 5. However, because an entry of the old MAC address registered in the ARP table (i.e. a table storing the MAC address in association with the IP address) held by the computer is typically deleted in about 60 seconds, any problem occurs. Namely, the computer carries out an ARP processing again, and can normally communicate with the user terminal 5 by obtaining the new MAC address for the IP address of the user terminal 5 and registering the new MAC address into the ARP table.

Next, FIG. 23 will be explained. The authentication requesting unit 51 judges whether or not the timeout of the response waiting timer occurs (FIG. 23: step S271). When the timeout of the response waiting timer occurs (step S271: Yes route), the authentication requesting unit 51 clears the response waiting timer, and displays a message representing "authentication impossible" on the display device (step S273), and the processing ends. Thus, the user can recognize that the authentication processing was not normally carried out by the authentication apparatus 3.

On the other hand, when the timeout of the response waiting timer does not occur (step S271: No route), the authentication requesting unit 51 judges whether or not a response message including the connection SrcMAC address was received from the authentication apparatus 3 (step S275). When the response message was not received from the authentication apparatus 3 (step S275: No route), the processing returns to the step S271. On the other hand, when the response message was received from the authentication apparatus 3 (step S275: Yes route), the authentication requesting unit 51 clears the response waiting timer (step S277). The connection SrcMAC address is a MAC address allocated to the user terminal 5 from the authentication apparatus 3 when the authentication succeeded, and the user terminal 5 can communicate with any apparatus on the network 1 side by attaching the MAC address to the transmission packet.

Then, the authentication requesting unit 51 confirms a content of the response message (step S279). When the content of the response message does not represent "authentication succeeded" (step S279: No route), the authentication requesting unit 51 displays a message representing "authentication failed" on the display device (step S281), and the processing ends. Thus, the user can recognize that the authentication failed. On the other hand, when the content of the response message represents "authentication succeeded" (step S279: Yes route), the authentication requesting unit 51 stores the connection SrcMAC address included in the response message into the storage device such as the main memory (step S283).

Then, the communication manager 53 displays a screen prompting an input of the connection destination, and when the connection destination is designated by the user and the connection is instructed, the communication manager 53 accepts the instruction as the connection request to the designated connection destination, and transmits a packet including the connection SrcMAC address stored in the storage device such as the main memory to the connection destination designated by the user (step S285).

Then, the communication manager 53 judges whether or not the communication succeeded (step S287). When the communication failed (step S287: No route), the communication manager 53 displays a message representing "communication failed" on the display device (step S289), and the processing ends. Thus, the user can recognize the communication failed due to some errors.

On the other hand, when the communication succeeded (step S287: Yes route), namely, when the gateway 7 receives a packet including the connection SrcMAC address from the user terminal 5 and the same MAC address is stored in the MAC filter table storage 72, the gateway 7 can pass the packet, and the user terminal 5 can normally connect with the server 9 on the network 1.

After that, at an arbitrary timing in a period from the success of the communication at the step S287 to the transmission of the disconnection request, the reconnection SrcMAC address generator 54 of the user terminal 5 carries out computation using the specific information stored in the storage device such as the main memory as the seed with the predetermined key to generate the reconnection SrcMAC address, and stores the reconnection SrcMAC address into the reconnection SrcMAC address 52 (step S291). Then, the processing ends. In this embodiment, the computation algorithm is designed so that the reconnection SrcMAC address do not overlap with the MAC addresses (i.e. the MAC addresses of the terminals, which are stored in the authentication table storage 31) intrinsic to the user terminals and the allocated SrcMAC addresses stored in the allocatable SrcMAC address table storage 33. In addition, the seed, predetermined key and computation algorithm, which are used when the user terminal 5 generates the reconnection SrcMAC address are common to those used by the authentication apparatus 3. Therefore, the user terminal 5 and the authentication apparatus 3 generate the same reconnection SrcMAC address. Thus, the disconnection request processing has been completed in the user terminal 5.

Figure 24:
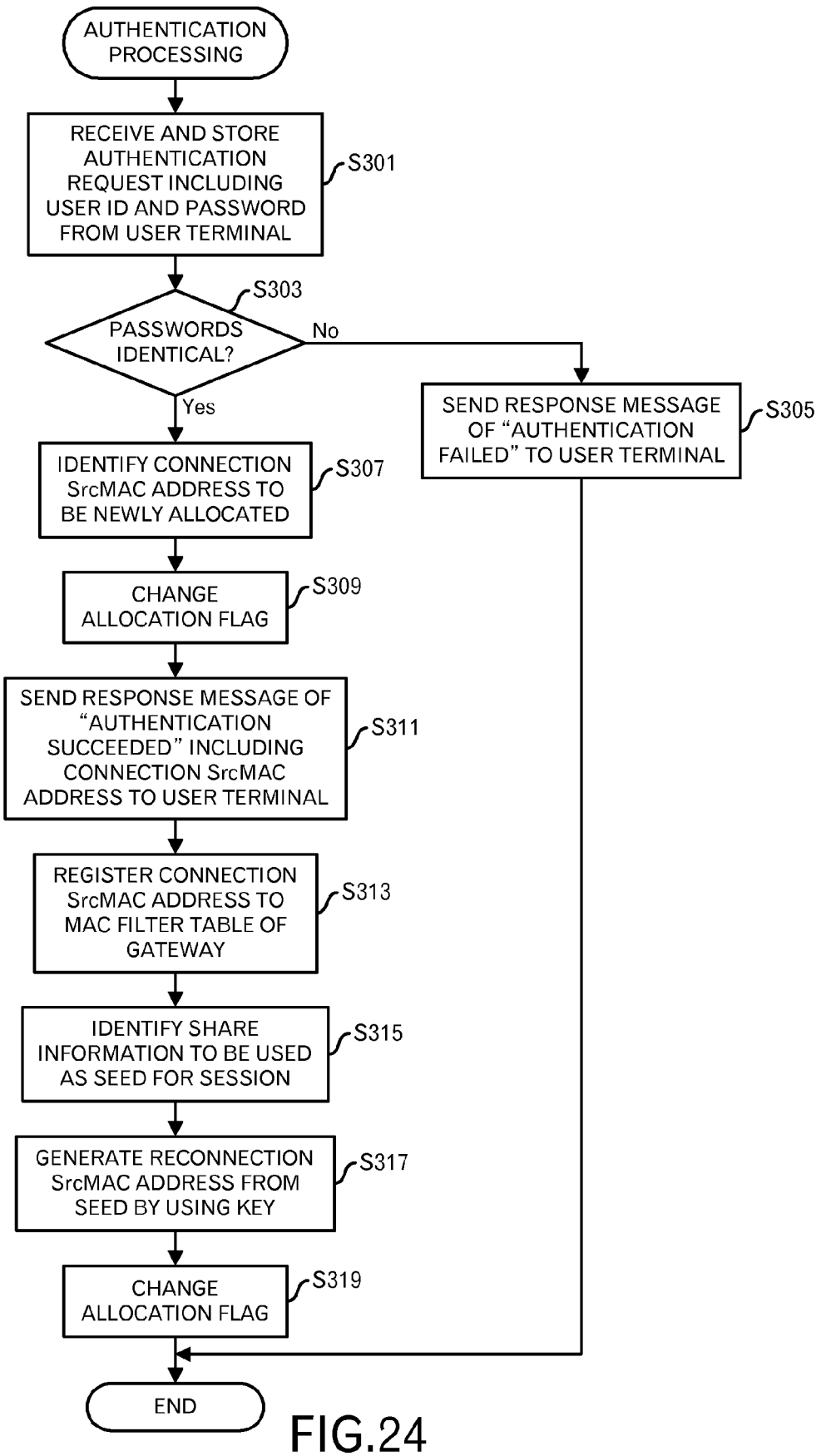
FIG. 24 is a diagram depicting a processing flow of the authentication processing in the fourth embodiment.

Next, a content of the authentication processing in the authentication apparatus 3 will be explained by using FIG. 24. First, the authentication processor 32 of the authentication apparatus 3 receives the authentication request including the user ID and password from the user terminal 5, and stores the authentication request into the storage device such as the main memory (FIG. 24: step S301). Then, the authentication processor 32 identifies a password registered in association with the received user ID from the authentication table storage 31, and judges whether or not the received password is identical with the identified password (step S303). When it is determined that the passwords are not identical (step S303: No route), the authentication processor 32 transmits the response message representing "authentication failed" to the user terminal 5 (step S305), and the processing ends.

On the other hand, when it is determined that the passwords are identical (step S303: Yes route), the authentication processor 32 identifies one allocatable SrcMAC address stored in the allocatable SrcMAC address table storage 33, and stores the SrcMAC address into the storage device such as the main memory (step S307). Incidentally, in this embodiment, the allocatable SrcMAC address table storage 33 depicted in FIG. 14 is used. At the step S307, the authentication processor 32 checks the allocation flags, and identifies one of the SrcMAC addresses whose flag is "0" (i.e. "allocatable"). In addition, the authentication processor 32 changes the allocation flag corresponding to the identified SrcMAC address to "1" (i.e. not allocatable because it is used as the connection SrcMAC address.) and stores the MAC address of the user terminal 5, which is included in the authentication request, in association with the identified SrcMAC address (step S309). Then, the authentication processor 32 transmits the response message representing "allocation succeeded", which includes the identified connection SrcMAC address, to the user terminal 5 (step S311).

Incidentally, at the step S303, in addition to confirmation of whether or not the passwords are identical, the authentication processor 32 may also confirm whether or not the MAC address, which is intrinsic to the user terminal 5 and included in the authentication request, is identical with the MAC address of the terminal, which is stored in the authentication table storage 31 in association with the received user ID. This is to allocate the connection SrcMAC address or the like only to the user terminal, which has already been registered. In addition, the authentication apparatus 3 manages the MAC address intrinsic to the user terminal 5 by using the authentication table storage 31 in order not to allocate the MAC address overlapping with the MAC address intrinsic to the user terminal 5, as the SrcMAC address.

Then, the MAC filter setting manager 34 of the authentication apparatus 3 instructs the MAC filter table manager 71 of the gateway 7 to register the connection SrcMAC address stored in the storage device such as the main memory into the MAC filter table storage 72, and the MAC filter table manager 71 registers the connection SrcMAC address to the MAC filter table (step S313). Then, the MAC filtering unit 73 of the gateway 7 passes the packets including the connection SrcMAC address to the network 1 side.

After that, at an arbitrary timing in a period from the step S313 to the receipt of the disconnection request, the authentication processor 32 of the authentication apparatus 3 extracts specific information included in the authentication request, and stores the specific information into the storage device (step S315). The specific information is the same as the information extracted at the step S267 of FIG. 22 by the user terminal 5.

Then, the reconnection SrcMAC address generator 36 of the authentication apparatus 3 carries out computation using the specific information stored in the storage device as the seed with the predetermined key to generate the reconnection SrcMAC address, and stores the generated reconnection SrcMAC address into the storage device such as the main memory (step S317). Similar to the step S291 of FIG. 23, the computation algorithm is designed so that the reconnection SrcMAC address does not overlap with the MAC addresses (i.e. MAC addresses of the terminals, which are stored in the authentication table storage 31) intrinsic to the user terminal and the allocated SrcMAC addresses stored in the allocatable SrcMAC address table storage 33. In addition, because the seed, predetermined key and computation algorithm, which are used when the authentication apparatus 3 generates the reconnection SrcMAC address, are common to those used by the user terminal 5, the user terminal 5 and the authentication apparatus 3 generate the same reconnection SrcMAC address.

Then, the authentication processor 32 stores a record including the reconnection SrcMAC address stored in the storage device such as the main memory and the MAC address of the user terminal 5, which is included in the authentication request, into the allocatable SrcMAC address table storage 33 (step S319), and the processing ends. Here, the allocation flag relating to this record is "2" (i.e. not allocatable because it is allocated as the reconnection SrcMAC address). Incidentally, in this embodiment, the record for the reconnection SrcMAC address is temporarily stored into the allocatable SrcMAC address table storage 33, and after the expiring date and time are set in the disconnection processing by the authentication apparatus 3, the record is deleted at the step S105 in the timeout processing in FIG. 13, further after the record expires. Thus, the authentication processing in the authentication apparatus 3 has been completed.

By carrying out the aforementioned processing of the fourth embodiment, the same effect as that of the second embodiment can be obtained. Furthermore, because the reconnection SrcMAC address is not sent from the authentication apparatus 3 to the user terminal 5 and the user terminal 5 independently generates the reconnection SrcMAC address, the security is improved.

Although the embodiments of this technique have been explained above, this technique is not limited to those. For example, the functional block diagrams depicted in FIGS. 1 and 19 are mere examples, and they may not always correspond to the actual program module configuration.

In addition, as long as the same effect can be obtained, the order of the processing steps may be exchanged or the processing steps may be executed in parallel.

Incidentally, in the first to fourth embodiment, the user terminal 5 transmits the packet including the reconnection SrcMAC address to the designated connection destination when the reconnection SrcMAC address does not expire. However, a processing to confirm the expiring date and time may not be carried out. This is because, when the update of the MAC filter table in the gateway 7 is normally carried out, the passage and interruption of the packet including the reconnection SrcMAC address are controlled by the gateway 7. There is a merit that, even when the information concerning the expiring date and time could not be received from the authentication apparatus 3 by the user terminal 5 and the disconnection was made, the reconnection to the network 1 side can be made if the reconnection SrcMAC address does not expire.

In addition, in the third and fourth embodiments, the user terminal 5 and the authentication apparatus 3 respectively generate the reconnection SrcMAC address. However, only the authentication apparatus 3 may generate the reconnection SrcMAC address, and transmits the reconnection SrcMAC address to the user terminal 5 through the secure path (e.g. SSL).

In addition, in the first to fourth embodiments, the IP address may be used instead of the MAC address. In such a case, an apparatus (e.g. layer-3 switch) having a table that stores IP addresses for which the connection is permitted may be used as the gateway 7, and the authentication apparatus 3 may control the registration and deletion for the table through an outside interface.

The embodiments explained above may be outlined as follows:

According to a first viewpoint of the embodiments, a network connection control method is a method for controlling a network connection of a user terminal that is connected through a gateway having an address filter table storing addresses, for which a connection to a first network is permitted, to the first network, after authentication by a authentication apparatus connected to the gateway is completed, and is connected through a second network to the gateway. Then, this method includes: at a first timing when a disconnection request for a connection with the first network is received from the user terminal, or before the first timing, the authentication apparatus extracting an allocatable address other than an address currently used by the user terminal from an allocatable address storage device storing addresses in association with information representing whether or not the corresponding address is allocatable; the authentication apparatus transmitting the extracted address as a reconnection address, which is valid for a predetermined valid period, to the user terminal; and the authentication causing the gateway to update the address filter table of the gateway from the address currently used to the reconnection address at a timing of the disconnection of the user terminal from the first network. Furthermore, when a reconnection to the first network is requested from the user terminal by using the reconnection address within the predetermined valid period, the gateway allows the reconnection to the first network without passing the authentication by the authentication apparatus.

Thus, because the processing for the authentication is not required for the user who intends to connect with the first network by using the reconnection address, within the predetermined period, the processing load of the authentication apparatus is reduced.

According to a second viewpoint of the embodiments, a network connection control method includes: at a first timing when a disconnection request for a connection with a first network is received from a user terminal or before the first timing, the authentication apparatus generating an allocatable address other than an address currently used by the user terminal, as a reconnection address; and at a second timing of the disconnection from the first network by the user terminal, the authentication apparatus causing the gateway to update the address filter table of the gateway from the address currently used to the reconnection address, which is valid for a predetermined valid period. Then, when a reconnection to the first network is requested from the user terminal by using the same address as the reconnection address within the predetermined valid period, the gateway allows the reconnection to the first network without passing the authentication by the authentication apparatus.

Thus, because the processing for the authentication is not required for the user who intends to connect with the first network within the predetermined period by using the same address as the reconnection address generated by the authentication apparatus, the processing load in the authentication apparatus is reduced. In addition, because the authentication apparatus does not send the reconnection address, the security is improved.

According to a third viewpoint of the embodiments, a network connection method is executed by a user terminal that is connected to a first network through a gateway after authentication by an authentication apparatus connected to the gateway having an address filter table storing addresses for which the connection with the first network is allowed, and is connected with the gateway through a second network. Then, this method includes: after a first timing when a disconnection request for the connection with the first network is transmitted or before the first timing, receiving an address, which is valid for a predetermined valid period and is other than an address the user terminal currently uses, as a reconnection address, and storing the reconnection address into a reconnection address storage device; when a present time is within the predetermined valid period after the connection with the first network was disconnected, carrying out a reconnect ion with the first network by using the reconnect ion address, which is stored in the reconnection address storage device, without the authentication by the authentication apparatus.

Thus, because the authentication is not required for the user who intends to connect with the first network by using the reconnection address, within the predetermined period, it is possible to smoothly connect with the first network.

According to a fourth viewpoint of the embodiments, a network connection method includes: after a first timing when a disconnection request for a connection with the first network is transmitted, or before the first timing, generating the same address as an address that is other than address currently used by the user terminal and is generated by the authentication apparatus, as a reconnection address, and storing the reconnection address that is valid for a predetermined valid period into a reconnection address storage device; and when a present time is within the predetermined valid period after the connection with the first network is disconnected, reconnecting to the first network by using the reconnection address stored in the reconnection address storage device without the authentication by the authentication apparatus.

Thus, because the authentication by the authentication apparatus is not required for the user who intends to connect with the first network within the predetermined period by using the same address as the reconnection address generated by the authentication apparatus, it is possible to smoothly connect with the first network.

In addition, the network connection control method according to the first and second viewpoints may further include: after the predetermined period, causing the gateway to delete the reconnection address registered in an address filter table in case where the reconnection address is not registered in a management table (e.g. MAC learning table in the embodiments) managing addresses of the user terminals being currently connecting with the gateway, after the predetermined valid period. Thus, the user terminal, which does not connect with the network after the predetermined valid period elapsed, cannot connect with the first network by using the reconnection address.

Furthermore, the aforementioned address being currently used by the user terminal may be an address (e.g. connection SrcMAC address in the embodiments) transmitted from the authentication apparatus to the user terminal, among allocatable addresses in the allocatable address storage device, when the authentication has been completed. Thus, it becomes possible to distinguish the user terminal to which the address is transmitted after the authentication is completed, the user terminal for which the authentication has not been carried out, and the user terminal, which carries out the reconnection without passing the authentication.

Furthermore, the aforementioned generating may includes generating the reconnection address common to the user terminal by processing a key common to the user terminal and information (e.g. identifier information in the IP header of the packet relating to the authentication request or disconnection request in the embodiments) included at a predetermined position of a message received from the user terminal with a predetermined algorithm common to the user terminal. By using the information included at the predetermined position of the message, it is possible to avoid that the generated reconnection address always becomes the same.

Furthermore, the aforementioned address may be a MAC address or an IP address.

Incidentally, a program for causing a computer to execute the aforementioned method can be created, and the program is stored in a storage medium or a storage device such as flexible disk, CD-ROM, a magneto-optic disk, a semiconductor memory or hard disk. Incidentally, data during the processing is temporarily stored in a storage device such as a memory of a computer or the like.

Figure 25:
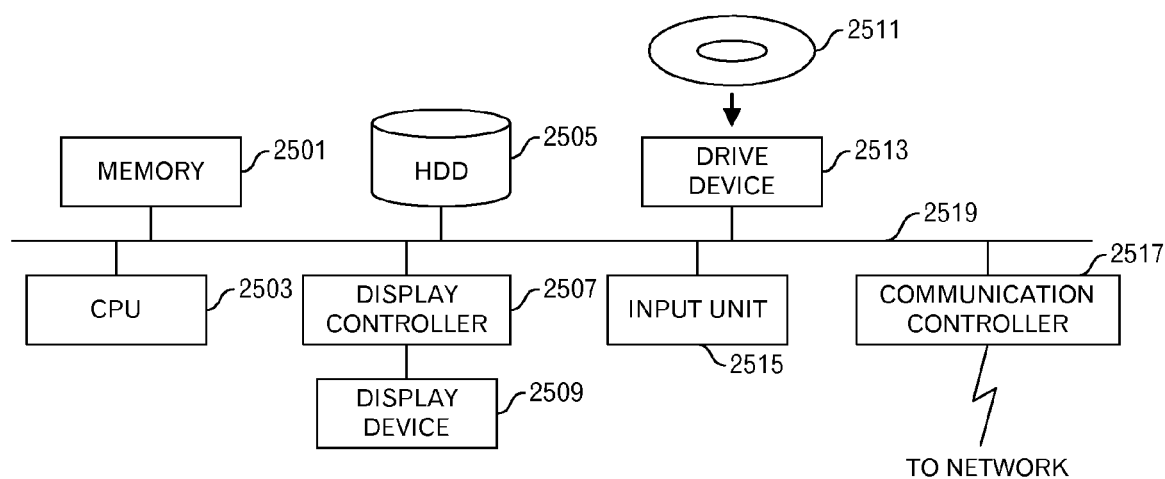
FIG. 25 is a functional block diagram of a computer.

In addition, the authentication apparatus 3 and the user terminal 5 are computer devices as shown in FIG. 25. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 25. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing an authentication apparatus to execute a network connection control process for controlling a network connection of a user terminal, wherein said network connection control process comprises:

at a first timing when a disconnection request for a connection with a first network is received from a user terminal that is connected to said first network through a gateway and is connected through a second network to said gateway, or before said first timing, extracting an allocatable address other than a first address currently used by said user terminal from an allocated address storage device storing addresses in association with information representing whether or not the corresponding address is allocatable, wherein said gateway has an address filter table storing addresses, for which a connection to said first network is permitted, after authentication by said authentication apparatus connected to said gateway is completed;

transmitting the extracted address as a reconnection address, which is valid for a predetermined valid period, to said user terminal; and causing said gateway to replace said first address in said address filter table of said gateway with said reconnection address at a timing of a disconnection of said user terminal from said first network, wherein said disconnection makes said gateway filter frames having said first address from said user terminal, and wherein, in response that a reconnection to said first network is requested after said disconnection from said user terminal by using said reconnection address within said predetermined valid period, said gateway allows said reconnection of said user terminal to said first network without passing said authentication by said authentication apparatus.

2. The computer-readable, non-transitory storage medium as set forth in claim 1, wherein said network connection control process further comprises causing said gateway to delete said reconnection address registered in said address filter table in response to detecting that said reconnection address is not registered in a management table managing addresses of the user terminals being currently connecting with said gateway, after said predetermined valid period.

3. The computer-readable, non-transitory storage medium a set forth in claim 1, wherein said address being currently used by said user terminal is an address transmitted from said authentication apparatus to said user terminal, among allocatable addresses in said allocatable address storage device, in response to completion of the authentication by the authentication apparatus.

4. A computer-readable, non-transitory storage medium storing a program for causing a user terminal to execute a network connection process, said network connection process comprises:

receiving a reconnection address, which is valid for a predetermined valid period and is other than a first address that said user terminal, which is connected to a first network through a gateway and is connected through a second network to said gateway, currently uses and storing said reconnection address into a reconnection address storage device, wherein said gateway has an address filter table storing addresses, for which a connection to said first network is permitted, after authentication by an authentication apparatus connected to said gateway is completed;

within said predetermined valid period after a disconnection of said user terminal to said first network, carrying out a reconnection with said first network by using said reconnection address, which is stored in said reconnection address storage device, without said authentication by said authentication apparatus, wherein said disconnection makes said gateway filter frames having said first address from said user terminal.

* * * * *

UNITED STATES PATENT AND TRADEMARK OFFICE
CERTIFICATE OF CORRECTION

PATENT NO. : 8,019,891 B2  Page 1 of 1
APPLICATION NO. : 12/493427
DATED : September 13, 2011
INVENTOR(S) : Toshihiko Kurita It is certified that error appears in the above-identified patent and that said Letters Patent is hereby corrected as shown below:

Title Page, Foreign Application Priority Data is omitted, please add the following:

-- Foreign Application Priority Data

Oct. 8, 2008 (JP) ..............................2008-262143 --.

Signed and Sealed this
Twenty-fifth Day of September, 2012

David J. Kappos
*Director of the United States Patent and Trademark Office*